(12) United States Patent
Hermeline et al.

(10) Patent No.: US 8,905,651 B2
(45) Date of Patent: Dec. 9, 2014

(54) DISMOUNTABLE OPTICAL COUPLING DEVICE

(71) Applicants: Nicolas Hermeline, Barjouville (FR); Alain Flers, La Ferte Bernard (FR); Stephane Barlerin, Dieulefit (FR); Yves Stricot, Villepreux (FR)

(72) Inventors: Nicolas Hermeline, Barjouville (FR); Alain Flers, La Ferte Bernard (FR); Stephane Barlerin, Dieulefit (FR); Yves Stricot, Villepreux (FR)

(73) Assignee: FCI, Guyancourt (FR)

( * ) Notice: Subject to any disclaimer, the term of this patent is extended or adjusted under 35 U.S.C. 154(b) by 0 days.

(21) Appl. No.: 13/751,379

(22) Filed: Jan. 28, 2013

(65) Prior Publication Data

US 2013/0195408 A1 Aug. 1, 2013

(30) Foreign Application Priority Data

Jan. 31, 2012 (EP) .................................... 12305119

(51) Int. Cl.
*G02B 6/36* (2006.01)
*G02B 6/42* (2006.01)

(52) U.S. Cl.
CPC ............ *G02B 6/3628* (2013.01); *G02B 6/4206* (2013.01); *G02B 6/4239* (2013.01); *G02B 6/4292* (2013.01); *G02B 6/4249* (2013.01); *G02B 6/4214* (2013.01)
USPC .................................. 385/88; 385/92; 29/832

(58) Field of Classification Search
CPC .. G02B 6/4206; G02B 6/4239; G02B 6/4292; G02B 6/4249; G02B 6/4214; G02B 6/3628
USPC ......................................... 385/88–92; 29/832
See application file for complete search history.

(56) References Cited

U.S. PATENT DOCUMENTS

| | | | |
|---|---|---|---|
| 318,186 | A | 5/1885 | Hertzog |
| 741,052 | A | 10/1903 | Mahon |
| 1,477,527 | A | 12/1923 | Raettig |
| D86,515 | S | 3/1932 | Cox |
| 2,231,347 | A | 2/1941 | Reutter |
| 2,248,675 | A | 7/1941 | Huppert |
| 2,430,011 | A | 11/1947 | Gillentine |
| 2,664,552 | A | 12/1953 | Ericsson et al. |
| 2,759,163 | A | 8/1956 | Ustin et al. |

(Continued)

FOREIGN PATENT DOCUMENTS

| | | |
|---|---|---|
| DE | 1665181 | 4/1974 |
| DE | 3529218 | 2/1986 |

(Continued)

OTHER PUBLICATIONS

U.S. Appl. No. 29/418,299, filed Apr. 13, 2012, Buck et al.

(Continued)

*Primary Examiner* — Ellen Kim
(74) *Attorney, Agent, or Firm* — Baker & Hostetler LLP

(57) ABSTRACT

An optical communication system comprising: an optical circuit board comprising an optical interface having a transmission region, an optical coupling device comprising: a first optical interface having a first transmission region optically coupled to a corresponding transmission region of the optical interface of the optical circuit board, a second optical interface having a second transmission region adapted to be optically coupled to a corresponding transmission region of an optical interface of a mating optical device, a fixation part, wherein the optical communication system comprises a support element glued to the fixation part of the optical coupling device and removably mounted on the optical circuit board.

28 Claims, 4 Drawing Sheets

(56) References Cited

U.S. PATENT DOCUMENTS

| | | |
|---|---|---|
| 2,762,022 A | 9/1956 | Benander et al. |
| 2,849,700 A | 4/1958 | Perkin |
| 2,844,644 A | 7/1958 | Soule, Jr. |
| 2,858,372 A | 10/1958 | Kaufman |
| 3,011,143 A | 11/1961 | Dean |
| 3,115,379 A | 12/1963 | McKee |
| 3,178,669 A | 4/1965 | Roberts |
| 3,179,738 A | 4/1965 | De Lyon |
| 3,208,030 A | 9/1965 | Evans et al. |
| 3,286,220 A | 11/1966 | Marley et al. |
| 3,320,658 A | 5/1967 | Bolda et al. |
| 3,343,120 A | 9/1967 | Whiting |
| 3,366,729 A | 1/1968 | Pauza |
| 3,411,127 A | 11/1968 | Adams |
| 3,420,087 A | 1/1969 | Hatfield et al. |
| D213,697 S | 4/1969 | Oxley |
| 3,482,201 A | 12/1969 | Schneck |
| 3,514,740 A | 5/1970 | Filson et al. |
| 3,538,486 A | 11/1970 | Shlesinger, Jr. |
| 3,560,908 A | 2/1971 | Dell et al. |
| 3,591,834 A | 7/1971 | Kolias |
| 3,634,811 A | 1/1972 | Teagno |
| 3,641,475 A | 2/1972 | Irish et al. |
| 3,663,925 A | 5/1972 | Proctor |
| 3,669,054 A | 6/1972 | Desso et al. |
| 3,692,994 A | 9/1972 | Hirschmann et al. |
| 3,701,076 A | 10/1972 | Irish |
| 3,719,981 A | 3/1973 | Steitz |
| 3,732,697 A | 5/1973 | Dickson |
| 3,748,633 A | 7/1973 | Lundergan |
| 3,827,005 A | 7/1974 | Friend |
| 3,845,451 A | 10/1974 | Neidecker |
| 3,864,004 A | 2/1975 | Friend |
| 3,865,462 A | 2/1975 | Cobaugh et al. |
| 3,867,008 A | 2/1975 | Gartland, Jr. |
| 3,871,015 A | 3/1975 | Lin et al. |
| 3,889,364 A | 6/1975 | Krueger |
| 3,942,856 A | 3/1976 | Mindheim et al. |
| 3,972,580 A | 8/1976 | Pemberton et al. |
| 4,030,792 A | 6/1977 | Fuerst |
| 4,056,302 A | 11/1977 | Braun et al. |
| 4,070,088 A | 1/1978 | Vaden |
| 4,076,362 A | 2/1978 | Ichimura |
| 4,082,407 A | 4/1978 | Smorzaniuk et al. |
| 4,097,266 A | 6/1978 | Takahashi et al. |
| 4,136,919 A | 1/1979 | Howard et al. |
| 4,140,361 A | 2/1979 | Sochor |
| 4,159,861 A | 7/1979 | Anhalt |
| 4,217,024 A | 8/1980 | Aldridge et al. |
| 4,232,924 A | 11/1980 | Kline et al. |
| 4,260,212 A | 4/1981 | Ritchie et al. |
| 4,274,700 A | 6/1981 | Keglewitsch et al. |
| 4,288,139 A | 9/1981 | Cobaugh et al. |
| 4,371,912 A | 2/1983 | Guzik |
| 4,380,518 A | 4/1983 | Wydro, Sr. |
| 4,383,724 A | 5/1983 | Verhoeven |
| 4,395,086 A | 7/1983 | Marsh |
| 4,396,140 A | 8/1983 | Jaffe et al. |
| 4,402,563 A | 9/1983 | Sinclair |
| 4,403,821 A | 9/1983 | Zimmerman et al. |
| 4,448,467 A | 5/1984 | Weidler |
| 4,462,534 A | 7/1984 | Bitaillou et al. |
| 4,464,003 A | 8/1984 | Goodman et al. |
| 4,473,113 A | 9/1984 | Whitfield et al. |
| 4,473,477 A | 9/1984 | Beall |
| D275,849 S | 10/1984 | Sakurai |
| 4,482,937 A | 11/1984 | Berg |
| 4,505,529 A | 3/1985 | Barkus |
| 4,523,296 A | 6/1985 | Healy, Jr. |
| 4,533,187 A | 8/1985 | Kirkman |
| 4,536,955 A | 8/1985 | Gudgeon |
| 4,545,610 A | 10/1985 | Lakritz et al. |
| 4,552,425 A | 11/1985 | Billman |
| 4,560,222 A | 12/1985 | Dambach |
| 4,564,259 A | 1/1986 | Vandame |
| 4,592,846 A | 6/1986 | Metzger et al. |
| 4,596,428 A | 6/1986 | Tengler |
| 4,596,433 A | 6/1986 | Oesterheld et al. |
| 4,624,604 A | 11/1986 | Wagner et al. |
| 4,632,476 A | 12/1986 | Schell |
| 4,641,426 A | 2/1987 | Hartman et al. |
| 4,655,515 A | 4/1987 | Hamsher, Jr. et al. |
| 4,664,309 A | 5/1987 | Allen et al. |
| 4,664,456 A | 5/1987 | Blair et al. |
| 4,664,458 A | 5/1987 | Worth |
| 4,678,250 A | 7/1987 | Romine et al. |
| 4,685,886 A | 8/1987 | Denlinger et al. |
| 4,705,205 A | 11/1987 | Allen et al. |
| 4,705,332 A | 11/1987 | Sadigh-Behzadi |
| 4,717,360 A | 1/1988 | Czaja |
| 4,722,470 A | 2/1988 | Johary |
| 4,762,500 A | 8/1988 | Dola et al. |
| 4,767,344 A | 8/1988 | Noschese |
| 4,776,803 A | 10/1988 | Pretchel et al. |
| 4,782,893 A | 11/1988 | Thomas |
| 4,790,763 A | 12/1988 | Weber et al. |
| 4,806,107 A | 2/1989 | Arnold et al. |
| 4,815,987 A | 3/1989 | Kawano et al. |
| 4,818,237 A | 4/1989 | Weber |
| 4,820,169 A | 4/1989 | Weber et al. |
| 4,820,182 A | 4/1989 | Harwath et al. |
| 4,824,383 A | 4/1989 | Lemke |
| 4,830,264 A | 5/1989 | Bitaillou et al. |
| 4,836,791 A | 6/1989 | Grabbe et al. |
| 4,844,813 A | 7/1989 | Helfgott et al. |
| 4,846,727 A | 7/1989 | Glover et al. |
| 4,850,887 A | 7/1989 | Sugawara |
| 4,854,899 A | 8/1989 | Matthews |
| 4,867,713 A | 9/1989 | Ozu et al. |
| 4,871,110 A | 10/1989 | Fukasawa et al. |
| 4,878,611 A | 11/1989 | LoVasco et al. |
| 4,881,905 A | 11/1989 | Demler et al. |
| 4,882,554 A | 11/1989 | Akaba et al. |
| 4,884,335 A | 12/1989 | McCoy et al. |
| 4,898,539 A | 2/1990 | Glover et al. |
| 4,900,271 A | 2/1990 | Colleran et al. |
| 4,904,212 A | 2/1990 | Durbin et al. |
| 4,907,990 A | 3/1990 | Bertho et al. |
| 4,908,129 A | 3/1990 | Finsterwalder et al. |
| 4,913,664 A | 4/1990 | Dixon et al. |
| 4,915,641 A | 4/1990 | Miskin et al. |
| 4,917,616 A | 4/1990 | Demler, Jr. et al. |
| 4,952,172 A | 8/1990 | Barkus et al. |
| 4,963,102 A | 10/1990 | Gettig et al. |
| 4,965,699 A | 10/1990 | Jorden et al. |
| 4,973,257 A | 11/1990 | Lhotak |
| 4,973,271 A | 11/1990 | Ishizuka et al. |
| 4,974,119 A | 11/1990 | Martin |
| 4,975,069 A | 12/1990 | Fedder et al. |
| 4,975,084 A | 12/1990 | Fedder et al. |
| 4,979,074 A | 12/1990 | Morley et al. |
| 4,997,390 A | 3/1991 | Scholz et al. |
| 5,004,426 A | 4/1991 | Barnett |
| 5,016,968 A | 5/1991 | Hammond et al. |
| 5,024,372 A | 6/1991 | Altman et al. |
| 5,024,610 A | 6/1991 | French et al. |
| 5,035,631 A | 7/1991 | Piorunneck et al. |
| 5,035,639 A | 7/1991 | Kilpatrick et al. |
| 5,046,960 A | 9/1991 | Fedder et al. |
| 5,052,953 A | 10/1991 | Weber |
| 5,055,054 A | 10/1991 | Doutrich |
| 5,060,844 A | 10/1991 | Behun et al. |
| 5,065,282 A | 11/1991 | Polonio |
| 5,066,236 A | 11/1991 | Broeksteeg |
| 5,077,893 A | 1/1992 | Mosquera et al. |
| 5,082,459 A | 1/1992 | Billman et al. |
| 5,083,238 A | 1/1992 | Bousman |
| 5,093,986 A | 3/1992 | Mandai et al. |
| 5,094,623 A | 3/1992 | Scharf et al. |
| 5,094,634 A | 3/1992 | Dixon et al. |
| 5,098,311 A | 3/1992 | Roath et al. |
| 5,104,332 A | 4/1992 | McCoy |
| 5,104,341 A | 4/1992 | Gilissen et al. |
| 5,111,991 A | 5/1992 | Clawson et al. |

(56) References Cited

U.S. PATENT DOCUMENTS

| | | |
|---|---|---|
| 5,117,331 A | 5/1992 | Gebara |
| 5,118,027 A | 6/1992 | Braun et al. |
| 5,120,237 A | 6/1992 | Fussell |
| 5,127,839 A | 7/1992 | Korsunsky et al. |
| 5,131,871 A | 7/1992 | Banakis et al. |
| 5,137,959 A | 8/1992 | Block et al. |
| 5,139,426 A | 8/1992 | Barkus et al. |
| 5,145,104 A | 9/1992 | Apap et al. |
| 5,151,056 A | 9/1992 | McClune |
| 5,152,700 A | 10/1992 | Bogursky et al. |
| 5,161,987 A | 11/1992 | Sinisi |
| 5,163,337 A | 11/1992 | Herron et al. |
| 5,163,849 A | 11/1992 | Fogg et al. |
| 5,167,528 A | 12/1992 | Nishiyama et al. |
| 5,169,337 A | 12/1992 | Ortega et al. |
| 5,174,770 A | 12/1992 | Sasaki et al. |
| 5,181,855 A | 1/1993 | Mosquera et al. |
| 5,194,480 A | 3/1993 | Block et al. |
| 5,199,885 A | 4/1993 | Korsunsky et al. |
| 5,203,075 A | 4/1993 | Angulas et al. |
| 5,207,372 A | 5/1993 | Funari et al. |
| 5,213,868 A | 5/1993 | Liberty et al. |
| 5,214,308 A | 5/1993 | Nishiguchi |
| 5,217,381 A | 6/1993 | Zell et al. |
| 5,222,649 A | 6/1993 | Funari et al. |
| 5,224,867 A | 7/1993 | Ohtuski et al. |
| 5,228,864 A | 7/1993 | Fusselman et al. |
| 5,229,016 A | 7/1993 | Hayes et al. |
| 5,238,414 A | 8/1993 | Yaegashi et al. |
| 5,254,012 A | 10/1993 | Wang |
| 5,255,839 A | 10/1993 | Da Costa Alves et al. |
| 5,257,941 A | 11/1993 | Lwee et al. |
| 5,261,155 A | 11/1993 | Angulas et al. |
| 5,269,453 A | 12/1993 | Melton et al. |
| 5,274,918 A | 1/1994 | Reed |
| 5,275,330 A | 1/1994 | Isaacs et al. |
| 5,276,964 A | 1/1994 | Anderson, Jr. et al. |
| 5,277,624 A | 1/1994 | Champion et al. |
| 5,284,287 A | 2/1994 | Wilson et al. |
| 5,285,163 A | 2/1994 | Liotta |
| 5,286,212 A | 2/1994 | Broeksteeg |
| 5,288,949 A | 2/1994 | Crafts |
| 5,295,843 A | 3/1994 | Davis et al. |
| 5,298,791 A | 3/1994 | Liberty et al. |
| 5,302,135 A | 4/1994 | Lee |
| 5,321,582 A | 6/1994 | Casperson |
| 5,324,569 A | 6/1994 | Nagesh et al. |
| 5,342,211 A | 8/1994 | Broeksteeg |
| 5,344,327 A | 9/1994 | Brunker et al. |
| 5,346,118 A | 9/1994 | Degani et al. |
| 5,354,219 A | 10/1994 | Wanjura |
| 5,355,283 A | 10/1994 | Marrs et al. |
| 5,356,300 A | 10/1994 | Costello et al. |
| 5,356,301 A | 10/1994 | Champion et al. |
| 5,357,050 A | 10/1994 | Baran et al. |
| 5,358,417 A | 10/1994 | Schmedding |
| 5,377,902 A | 1/1995 | Hayes |
| 5,381,314 A | 1/1995 | Rudy, Jr. et al. |
| 5,382,168 A | 1/1995 | Azuma et al. |
| D355,409 S | 2/1995 | Krokaugger |
| 5,387,111 A | 2/1995 | DeSantis et al. |
| 5,387,139 A | 2/1995 | McKee et al. |
| 5,395,250 A | 3/1995 | Englert, Jr. et al. |
| 5,400,949 A | 3/1995 | Hirvonen et al. |
| 5,403,206 A | 4/1995 | McNamara et al. |
| 5,409,157 A | 4/1995 | Nagesh et al. |
| 5,410,807 A | 5/1995 | Bross et al. |
| 5,427,543 A | 6/1995 | Dynia |
| 5,429,520 A | 7/1995 | Morlion et al. |
| 5,429,521 A | 7/1995 | Morlion et al. |
| 5,431,332 A | 7/1995 | Kirby et al. |
| 5,431,578 A | 7/1995 | Wayne |
| 5,433,617 A | 7/1995 | Morlion et al. |
| 5,433,618 A | 7/1995 | Morlion et al. |
| 5,435,482 A | 7/1995 | Variot et al. |
| 5,442,852 A | 8/1995 | Danner |
| 5,445,313 A | 8/1995 | Boyd et al. |
| 5,457,342 A | 10/1995 | Herbst, II |
| 5,458,426 A | 10/1995 | Ito |
| 5,462,456 A | 10/1995 | Howell |
| 5,467,913 A | 11/1995 | Namekawa et al. |
| 5,474,472 A | 12/1995 | Niwa et al. |
| 5,475,922 A | 12/1995 | Tamura et al. |
| 5,477,933 A | 12/1995 | Nguyen |
| 5,489,750 A | 2/1996 | Sakemi et al. |
| 5,490,040 A | 2/1996 | Gavdenzi et al. |
| 5,491,303 A | 2/1996 | Weiss |
| 5,492,266 A | 2/1996 | Hoebener et al. |
| 5,495,668 A | 3/1996 | Furusawa et al. |
| 5,496,183 A | 3/1996 | Soes et al. |
| 5,498,167 A | 3/1996 | Seto et al. |
| 5,499,487 A | 3/1996 | McGill |
| 5,504,277 A | 4/1996 | Danner |
| 5,511,987 A | 4/1996 | Schinchi |
| 5,512,519 A | 4/1996 | Hwang |
| 5,516,030 A | 5/1996 | Denton |
| 5,516,032 A | 5/1996 | Sakemi et al. |
| 5,518,410 A | 5/1996 | Masami |
| 5,519,580 A | 5/1996 | Natarajan et al. |
| 5,522,727 A | 6/1996 | Saito et al. |
| 5,533,915 A | 7/1996 | Deans |
| 5,534,127 A | 7/1996 | Sakai |
| 5,539,153 A | 7/1996 | Schwiebert et al. |
| 5,542,174 A | 8/1996 | Chiu |
| 5,558,542 A | 9/1996 | O'Sullivan et al. |
| 5,564,952 A | 10/1996 | Davis et al. |
| 5,575,688 A | 11/1996 | Crane, Jr. |
| 5,577,928 A | 11/1996 | Duclos |
| 5,580,283 A | 12/1996 | O'Sullivan et al. |
| 5,586,908 A | 12/1996 | Lorrain |
| 5,586,914 A | 12/1996 | Foster, Jr. et al. |
| 5,588,859 A | 12/1996 | Maurice |
| 5,590,463 A | 1/1997 | Feldman et al. |
| 5,591,118 A | 1/1997 | Bierck |
| 5,591,941 A | 1/1997 | Acocella et al. |
| 5,593,322 A | 1/1997 | Swamy et al. |
| 5,605,417 A | 2/1997 | Englert et al. |
| 5,609,502 A | 3/1997 | Thumma |
| 5,613,882 A | 3/1997 | Hnatuck et al. |
| 5,618,187 A | 4/1997 | Goto |
| 5,634,821 A | 6/1997 | Crane, Jr. |
| 5,637,008 A | 6/1997 | Kozel |
| 5,637,019 A | 6/1997 | Crane, Jr. et al. |
| 5,643,009 A | 7/1997 | Dinkel et al. |
| 5,664,968 A | 9/1997 | Micklevicz |
| 5,664,973 A | 9/1997 | Emmert et al. |
| 5,667,392 A | 9/1997 | Kocher et al. |
| 5,672,064 A | 9/1997 | Provencher et al. |
| 5,691,041 A | 11/1997 | Frankeny et al. |
| D387,733 S | 12/1997 | Lee |
| 5,697,799 A | 12/1997 | Consoli et al. |
| 5,702,255 A | 12/1997 | Murphy et al. |
| 5,713,746 A | 2/1998 | Olson et al. |
| 5,718,606 A | 2/1998 | Rigby et al. |
| 5,727,963 A | 3/1998 | LeMaster |
| 5,730,609 A | 3/1998 | Harwath |
| 5,733,453 A | 3/1998 | DeBusk |
| 5,741,144 A | 4/1998 | Elco et al. |
| 5,741,161 A | 4/1998 | Cahaly et al. |
| 5,742,484 A | 4/1998 | Gillette et al. |
| 5,743,009 A | 4/1998 | Matsui et al. |
| 5,743,765 A | 4/1998 | Andrews et al. |
| 5,745,349 A | 4/1998 | Lemke |
| 5,746,608 A | 5/1998 | Taylor |
| 5,749,746 A | 5/1998 | Tan et al. |
| 5,755,595 A | 5/1998 | Davis et al. |
| 5,766,023 A | 6/1998 | Noschese et al. |
| 5,772,451 A | 6/1998 | Dozier, II et al. |
| 5,782,644 A | 7/1998 | Kiat |
| 5,787,971 A | 8/1998 | Dodson |
| 5,795,191 A | 8/1998 | Preputnick et al. |
| 5,810,607 A | 9/1998 | Shih et al. |
| 5,817,973 A | 10/1998 | Elco et al. |
| 5,827,094 A | 10/1998 | Aizawa et al. |

(56) References Cited

U.S. PATENT DOCUMENTS

| | | |
|---|---|---|
| 5,831,314 A | 11/1998 | Wen |
| 5,833,475 A | 11/1998 | Mitra |
| 5,846,024 A | 12/1998 | Mao et al. |
| 5,851,121 A | 12/1998 | Thenaisie et al. |
| 5,853,797 A | 12/1998 | Fuchs et al. |
| 5,857,857 A | 1/1999 | Fukuda |
| 5,860,816 A | 1/1999 | Provencher et al. |
| 5,871,362 A | 2/1999 | Campbell et al. |
| 5,874,776 A | 2/1999 | Kresge et al. |
| 5,876,219 A | 3/1999 | Taylor |
| 5,876,222 A | 3/1999 | Gardner et al. |
| 5,876,248 A | 3/1999 | Brunker et al. |
| 5,882,214 A | 3/1999 | Hillbish et al. |
| 5,883,782 A | 3/1999 | Thurston et al. |
| 5,887,158 A | 3/1999 | Sample et al. |
| 5,888,884 A | 3/1999 | Wojnarowski |
| 5,892,791 A | 4/1999 | Moon |
| 5,893,761 A | 4/1999 | Longueville |
| 5,902,136 A | 5/1999 | Lemke et al. |
| 5,904,581 A | 5/1999 | Pope et al. |
| 5,908,333 A | 6/1999 | Perino et al. |
| 5,913,702 A | 6/1999 | Garcin |
| 5,919,050 A | 7/1999 | Kehley et al. |
| 5,930,114 A | 7/1999 | Kuzmin et al. |
| 5,938,479 A | 8/1999 | Paulson et al. |
| 5,943,770 A | 8/1999 | Thenaisie et al. |
| 5,955,888 A | 9/1999 | Frederickson et al. |
| 5,961,355 A | 10/1999 | Morlion et al. |
| 5,967,844 A | 10/1999 | Doutrich et al. |
| 5,971,817 A | 10/1999 | Longueville |
| 5,975,921 A | 11/1999 | Shuey |
| 5,980,270 A | 11/1999 | Fjelstad et al. |
| 5,980,321 A | 11/1999 | Cohen et al. |
| 5,982,249 A | 11/1999 | Bruns |
| 5,984,690 A | 11/1999 | Riechelmann et al. |
| 5,984,726 A | 11/1999 | Wu |
| 5,992,953 A | 11/1999 | Rabinovitz |
| 5,993,259 A | 11/1999 | Stokoe et al. |
| 6,012,948 A | 1/2000 | Wu |
| 6,022,227 A | 2/2000 | Huang |
| 6,024,584 A | 2/2000 | Lemke et al. |
| 6,027,381 A | 2/2000 | Lok |
| 6,036,549 A | 3/2000 | Wulff |
| 6,041,498 A | 3/2000 | Hillbish et al. |
| 6,042,389 A | 3/2000 | Lemke et al. |
| 6,042,394 A | 3/2000 | Mitra et al. |
| 6,042,427 A | 3/2000 | Adriaenssens et al. |
| 6,050,842 A | 4/2000 | Ferrill et al. |
| 6,050,862 A | 4/2000 | Ishii |
| 6,053,751 A | 4/2000 | Humphrey |
| 6,059,170 A | 5/2000 | Jimarez et al. |
| 6,066,048 A | 5/2000 | Lees |
| 6,068,520 A | 5/2000 | Winings et al. |
| 6,071,152 A | 6/2000 | Achammer et al. |
| 6,077,130 A | 6/2000 | Hughes et al. |
| 6,083,047 A | 7/2000 | Paagman |
| 6,086,386 A | 7/2000 | Fjelstad et al. |
| 6,089,878 A | 7/2000 | Meng |
| 6,095,827 A | 8/2000 | Dutkowsky et al. |
| 6,113,418 A | 9/2000 | Kjelhahl |
| 6,116,926 A | 9/2000 | Ortega et al. |
| 6,116,965 A | 9/2000 | Arnett et al. |
| 6,123,554 A | 9/2000 | Ortega et al. |
| 6,125,535 A | 10/2000 | Chiou et al. |
| 6,129,592 A | 10/2000 | Mickievicz et al. |
| 6,132,255 A | 10/2000 | Verhoeven |
| 6,139,336 A | 10/2000 | Olson |
| 6,146,157 A | 11/2000 | Lenoir et al. |
| 6,146,202 A | 11/2000 | Ramey et al. |
| 6,146,203 A | 11/2000 | Elco et al. |
| 6,152,747 A | 11/2000 | McNamara |
| 6,152,756 A | 11/2000 | Huang et al. |
| 6,154,742 A | 11/2000 | Herriot |
| 6,171,115 B1 | 1/2001 | Mickievicz et al. |
| 6,171,149 B1 | 1/2001 | Van Zanten |
| 6,174,198 B1 | 1/2001 | Wu et al. |
| 6,179,663 B1 | 1/2001 | Bradley et al. |
| 6,180,891 B1 | 1/2001 | Murdeshwar |
| 6,183,287 B1 | 2/2001 | Po |
| 6,183,301 B1 | 2/2001 | Paagman |
| 6,190,213 B1 | 2/2001 | Reichart et al. |
| 6,193,537 B1 | 2/2001 | Harper, Jr. et al. |
| 6,196,871 B1 | 3/2001 | Szu |
| 6,202,916 B1 | 3/2001 | Updike et al. |
| 6,206,722 B1 | 3/2001 | Ko et al. |
| 6,206,735 B1 | 3/2001 | Zanoli |
| 6,210,197 B1 | 4/2001 | Yu |
| 6,210,240 B1 | 4/2001 | Comerci et al. |
| 6,212,755 B1 | 4/2001 | Shimada et al. |
| 6,215,180 B1 | 4/2001 | Chen et al. |
| 6,219,913 B1 | 4/2001 | Uchiyama |
| 6,220,884 B1 | 4/2001 | Lin |
| 6,220,895 B1 | 4/2001 | Lin |
| 6,220,896 B1 | 4/2001 | Bertoncici et al. |
| 6,227,882 B1 | 5/2001 | Ortega et al. |
| 6,231,391 B1 | 5/2001 | Ramey et al. |
| 6,234,851 B1 | 5/2001 | Phillips |
| 6,238,225 B1 | 5/2001 | Middlehurst et al. |
| 6,241,535 B1 | 6/2001 | Lemke et al. |
| 6,244,887 B1 | 6/2001 | Commerci et al. |
| 6,257,478 B1 | 7/2001 | Straub |
| 6,259,039 B1 | 7/2001 | Chroneos, Jr. et al. |
| 6,261,132 B1 | 7/2001 | Koseki et al. |
| 6,267,604 B1 | 7/2001 | Mickievicz et al. |
| 6,269,539 B1 | 8/2001 | Takahashi et al. |
| 6,274,474 B1 | 8/2001 | Caletka et al. |
| 6,280,209 B1 | 8/2001 | Bassler et al. |
| 6,280,230 B1 | 8/2001 | Takase et al. |
| 6,280,809 B1 | 8/2001 | Wang et al. |
| 6,290,552 B1 | 9/2001 | Saito et al. |
| 6,293,827 B1 | 9/2001 | Stokoe et al. |
| 6,299,483 B1 | 10/2001 | Cohen et al. |
| 6,299,484 B2 | 10/2001 | Van Woensel et al. |
| 6,299,492 B1 | 10/2001 | Pierini et al. |
| 6,302,711 B1 | 10/2001 | Ito |
| 6,309,245 B1 | 10/2001 | Sweeney |
| 6,319,075 B1 | 11/2001 | Clark et al. |
| 6,322,377 B2 | 11/2001 | Middlehurst et al. |
| 6,322,379 B1 | 11/2001 | Ortega et al. |
| 6,322,393 B1 | 11/2001 | Doutrich et al. |
| 6,328,602 B1 | 12/2001 | Yamasaki et al. |
| 6,338,635 B1 | 1/2002 | Lee |
| 6,343,955 B2 | 2/2002 | Billman et al. |
| 6,347,952 B1 | 2/2002 | Hasegawa et al. |
| 6,347,962 B1 | 2/2002 | Kline |
| 6,350,134 B1 | 2/2002 | Fogg et al. |
| 6,354,877 B1 | 3/2002 | Shuey et al. |
| 6,358,061 B1 | 3/2002 | Regnier |
| 6,359,783 B1 | 3/2002 | Noble |
| 6,360,940 B1 | 3/2002 | Bolde et al. |
| 6,361,366 B1 | 3/2002 | Shuey et al. |
| 6,361,376 B1 | 3/2002 | Onoda |
| 6,362,961 B1 | 3/2002 | Chiou |
| 6,363,607 B1 | 4/2002 | Chen et al. |
| 6,364,710 B1 | 4/2002 | Billman et al. |
| 6,371,773 B1 | 4/2002 | Crofoot et al. |
| 6,371,813 B2 | 4/2002 | Ramey et al. |
| 6,375,478 B1 | 4/2002 | Kikuchi |
| 6,375,508 B1 | 4/2002 | Pickles et al. |
| 6,379,188 B1 | 4/2002 | Cohen et al. |
| 6,386,914 B1 | 5/2002 | Collins et al. |
| 6,386,924 B2 | 5/2002 | Long |
| 6,390,826 B1 | 5/2002 | Affolter et al. |
| 6,394,818 B1 | 5/2002 | Smalley, Jr. |
| 6,402,566 B1 | 6/2002 | Middlehurst et al. |
| 6,409,543 B1 | 6/2002 | Astbury, Jr. et al. |
| 6,414,248 B1 | 7/2002 | Sundstrom |
| 6,420,778 B1 | 7/2002 | Sinyansky |
| 6,428,328 B2 | 8/2002 | Haba et al. |
| 6,431,914 B1 | 8/2002 | Billman |
| 6,431,921 B2 | 8/2002 | Saito et al. |
| 6,435,914 B1 | 8/2002 | Billman |
| 6,450,829 B1 | 9/2002 | Weisz-Margulescu |
| 6,457,983 B1 | 10/2002 | Bassler et al. |

(56) References Cited

U.S. PATENT DOCUMENTS

| | | | |
|---|---|---|---|
| 6,461,183 B1 | 10/2002 | Ohkita et al. |
| 6,461,202 B2 | 10/2002 | Kline |
| 6,464,529 B1 | 10/2002 | Jensen et al. |
| 6,471,523 B1 | 10/2002 | Shuey |
| 6,471,548 B2 | 10/2002 | Bertoncini et al. |
| 6,472,474 B2 | 10/2002 | Burkhardt et al. |
| 6,482,038 B2 | 11/2002 | Olson |
| 6,485,330 B1 | 11/2002 | Doutrich |
| 6,488,549 B1 | 12/2002 | Weller et al. |
| 6,489,567 B2 | 12/2002 | Zachrai |
| 6,491,545 B1 | 12/2002 | Spiegel et al. |
| 6,494,734 B1 | 12/2002 | Shuey |
| 6,503,103 B1 | 1/2003 | Cohen et al. |
| 6,506,076 B2 | 1/2003 | Cohen et al. |
| 6,506,081 B2 | 1/2003 | Blanchfield et al. |
| 6,514,103 B2 | 2/2003 | Pape et al. |
| 6,517,360 B1 | 2/2003 | Cohen |
| 6,520,803 B1 | 2/2003 | Dunn |
| 6,526,519 B1 | 2/2003 | Cuthbert |
| 6,527,587 B1 | 3/2003 | Ortega et al. |
| 6,527,588 B2 | 3/2003 | Paagman |
| 6,528,737 B1 | 3/2003 | Kwong et al. |
| 6,530,134 B1 | 3/2003 | Laphan et al. |
| 6,537,086 B1 | 3/2003 | Mac Mullin |
| 6,537,111 B2 | 3/2003 | Brammer et al. |
| 6,540,522 B2 | 4/2003 | Sipe |
| 6,540,558 B1 | 4/2003 | Paagman |
| 6,540,559 B1 | 4/2003 | Kemmick et al. |
| 6,544,046 B1 | 4/2003 | Hahn et al. |
| 6,544,072 B2 | 4/2003 | Olson |
| 6,547,066 B2 | 4/2003 | Koch |
| 6,551,112 B1 | 4/2003 | Li et al. |
| 6,551,140 B2 | 4/2003 | Billman et al. |
| 6,554,647 B1 | 4/2003 | Cohen et al. |
| 6,565,387 B2 | 5/2003 | Cohen |
| 6,565,388 B1 | 5/2003 | Van Woensel et al. |
| 6,572,409 B2 | 6/2003 | Nitta et al. |
| 6,572,410 B1 | 6/2003 | Volstorf et al. |
| 6,575,774 B2 | 6/2003 | Ling et al. |
| 6,575,776 B1 | 6/2003 | Conner et al. |
| 6,589,071 B1 | 7/2003 | Lias et al. |
| 6,592,381 B2 | 7/2003 | Cohen et al. |
| 6,602,095 B2 | 8/2003 | Astbury, Jr. et al. |
| 6,604,967 B2 | 8/2003 | Middlehurst et al. |
| 6,607,402 B2 | 8/2003 | Cohen et al. |
| 6,623,310 B1 | 9/2003 | Billman et al. |
| 6,629,854 B2 | 10/2003 | Murakami |
| 6,633,490 B2 | 10/2003 | Centola et al. |
| 6,641,410 B2 | 11/2003 | Marvin et al. |
| 6,641,411 B1 | 11/2003 | Stoddard et al. |
| 6,641,825 B2 | 11/2003 | Scholz et al. |
| 6,652,318 B1 | 11/2003 | Winings et al. |
| 6,663,426 B2 | 12/2003 | Hasircoglu et al. |
| 6,665,189 B1 | 12/2003 | Lebo |
| 6,666,693 B2 | 12/2003 | Belopolsky et al. |
| 6,669,514 B2 | 12/2003 | Weibking et al. |
| 6,672,884 B1 | 1/2004 | Toh et al. |
| 6,672,907 B2 | 1/2004 | Azuma |
| 6,679,709 B2 | 1/2004 | Takeuchi |
| 6,692,272 B2 | 2/2004 | Lemke et al. |
| 6,695,627 B2 | 2/2004 | Ortega et al. |
| 6,702,590 B2 | 3/2004 | Zaderej et al. |
| 6,702,594 B2 | 3/2004 | Lee et al. |
| 6,705,902 B2 | 3/2004 | Yi et al. |
| 6,709,294 B1 | 3/2004 | Cohen et al. |
| 6,712,621 B2 | 3/2004 | Li et al. |
| 6,712,646 B2 | 3/2004 | Shindo |
| 6,716,045 B2 | 4/2004 | Meredith |
| 6,716,068 B2 | 4/2004 | Wu |
| 6,717,825 B2 | 4/2004 | Volstorf |
| 6,726,492 B1 | 4/2004 | Yu |
| 6,736,664 B2 | 5/2004 | Ueda et al. |
| 6,739,910 B1 | 5/2004 | Wu |
| 6,740,820 B2 | 5/2004 | Cheng |
| D492,295 S | 6/2004 | Glatt |
| 6,743,037 B2 | 6/2004 | Kassa et al. |
| 6,743,059 B1 | 6/2004 | Korsunsky et al. |
| 6,746,278 B2 | 6/2004 | Nelson et al. |
| 6,749,439 B1 | 6/2004 | Potter et al. |
| 6,762,067 B1 | 7/2004 | Quinones et al. |
| 6,764,341 B2 | 7/2004 | Lappoehn |
| 6,769,883 B2 | 8/2004 | Brid et al. |
| 6,769,935 B2 | 8/2004 | Stokoe et al. |
| 6,776,635 B2 | 8/2004 | Blanchfield et al. |
| 6,776,649 B2 | 8/2004 | Pape et al. |
| 6,780,027 B2 | 8/2004 | Allison et al. |
| 6,786,771 B2 | 9/2004 | Gailus |
| 6,790,088 B2 | 9/2004 | Ono et al. |
| 6,796,831 B1 | 9/2004 | Yasufuku et al. |
| 6,797,215 B2 | 9/2004 | Bonk et al. |
| D497,343 S | 10/2004 | Busse et al. |
| 6,805,278 B1 | 10/2004 | Olson et al. |
| 6,808,399 B2 | 10/2004 | Rothermel et al. |
| 6,808,420 B2 | 10/2004 | Whiteman, Jr. et al. |
| 6,810,783 B1 | 11/2004 | Larose |
| 6,811,440 B1 | 11/2004 | Rothermel et al. |
| 6,814,590 B2 | 11/2004 | Minich et al. |
| 6,814,619 B1 | 11/2004 | Stokoe et al. |
| 6,824,391 B2 | 11/2004 | Mickievicz et al. |
| 6,829,143 B2 | 12/2004 | Russell et al. |
| 6,835,072 B2 | 12/2004 | Simons et al. |
| 6,835,103 B2 | 12/2004 | Middlehurst et al. |
| 6,843,686 B2 | 1/2005 | Ohnishi et al. |
| 6,843,687 B2 | 1/2005 | McGowan et al. |
| 6,848,886 B2 | 2/2005 | Schmaling et al. |
| 6,848,944 B2 | 2/2005 | Evans |
| 6,848,950 B2 | 2/2005 | Allison et al. |
| 6,848,953 B2 | 2/2005 | Schell et al. |
| 6,851,974 B2 | 2/2005 | Doutrich |
| 6,851,980 B2 | 2/2005 | Nelson et al. |
| 6,852,567 B1 | 2/2005 | Lee et al. |
| D502,919 S | 3/2005 | Studnicky, III |
| 6,866,549 B2 | 3/2005 | Kimura et al. |
| 6,869,292 B2 | 3/2005 | Johnescu et al. |
| 6,869,294 B2 | 3/2005 | Clark et al. |
| 6,872,085 B1 | 3/2005 | Cohen et al. |
| 6,884,117 B2 | 4/2005 | Korsunsky et al. |
| 6,890,184 B2 | 5/2005 | Doblar et al. |
| 6,890,214 B2 | 5/2005 | Brown et al. |
| 6,890,221 B2 | 5/2005 | Wagner |
| 6,893,272 B2 | 5/2005 | Yu |
| 6,893,300 B2 | 5/2005 | Zhou et al. |
| 6,893,686 B2 | 5/2005 | Egan |
| 6,899,566 B2 | 5/2005 | Kline et al. |
| 6,902,411 B2 | 6/2005 | Kubo |
| 6,905,367 B2 | 6/2005 | Crane, Jr. et al. |
| 6,913,490 B2 | 7/2005 | Whiteman, Jr. et al. |
| 6,918,776 B2 | 7/2005 | Spink, Jr. |
| 6,918,789 B2 | 7/2005 | Lang et al. |
| 6,929,504 B2 | 8/2005 | Ling et al. |
| 6,932,649 B1 | 8/2005 | Rothermel et al. |
| 6,939,173 B1 | 9/2005 | Elco et al. |
| 6,945,796 B2 | 9/2005 | Bassler et al. |
| 6,947,012 B2 | 9/2005 | Aisenbrey |
| 6,951,466 B2 | 10/2005 | Sandoval et al. |
| 6,953,351 B2 | 10/2005 | Fromm et al. |
| 6,969,268 B2 | 11/2005 | Brunker |
| 6,969,280 B2 | 11/2005 | Chien et al. |
| 6,975,511 B1 | 12/2005 | Lebo et al. |
| 6,976,886 B2 | 12/2005 | Winings et al. |
| 6,979,202 B2 | 12/2005 | Benham et al. |
| 6,979,215 B2 | 12/2005 | Avery et al. |
| 6,981,883 B2 | 1/2006 | Raistrick et al. |
| 6,988,902 B2 | 1/2006 | Winings et al. |
| 6,994,569 B2 | 2/2006 | Minich et al. |
| 7,001,189 B1 | 2/2006 | McGowan et al. |
| 7,021,975 B2 | 4/2006 | Lappohn |
| 7,040,901 B2 | 5/2006 | Benham et al. |
| 7,044,794 B2 | 5/2006 | Consoli et al. |
| 7,059,892 B1 | 6/2006 | Trout |
| 7,059,919 B2 | 6/2006 | Clark et al. |
| 7,065,871 B2 | 6/2006 | Minich et al. |
| 7,070,464 B2 | 7/2006 | Clark et al. |
| 7,074,096 B2 | 7/2006 | Copper et al. |

(56) References Cited

U.S. PATENT DOCUMENTS

| | | |
|---|---|---|
| 7,086,147 B2 | 8/2006 | Caletka et al. |
| 7,090,501 B1 | 8/2006 | Scherer et al. |
| 7,094,102 B2 | 8/2006 | Cohen et al. |
| 7,097,465 B1 | 8/2006 | Korsunsky et al. |
| 7,097,506 B2 | 8/2006 | Nakada |
| 7,101,191 B2 | 9/2006 | Benham et al. |
| 7,101,228 B2 | 9/2006 | Hammer et al. |
| 7,104,812 B1 | 9/2006 | Bogiel et al. |
| 7,108,556 B2 | 9/2006 | Cohen et al. |
| 7,114,963 B2 | 10/2006 | Shuey et al. |
| 7,114,964 B2 | 10/2006 | Winings et al. |
| 7,118,391 B2 | 10/2006 | Minich et al. |
| RE39,380 E | 11/2006 | Davis |
| 7,131,870 B2 | 11/2006 | Whiteman, Jr. et al. |
| 7,137,848 B1 | 11/2006 | Trout et al. |
| 7,153,162 B2 | 12/2006 | Mizumura et al. |
| 7,160,151 B2 | 1/2007 | Rigby et al. |
| 7,163,421 B1 | 1/2007 | Cohen et al. |
| 7,168,963 B2 | 1/2007 | Minich et al. |
| 7,172,461 B2 | 2/2007 | Davis et al. |
| 7,182,642 B2 | 2/2007 | Ngo et al. |
| 7,182,643 B2 | 2/2007 | Winings et al. |
| D540,258 S | 4/2007 | Peng et al. |
| 7,204,699 B2 | 4/2007 | Stoner |
| 7,207,807 B2 | 4/2007 | Fogg |
| D541,748 S | 5/2007 | Peng et al |
| D542,736 S | 5/2007 | Riku |
| 7,220,141 B2 | 5/2007 | Daily et al. |
| 7,239,526 B1 | 7/2007 | Bibee |
| 7,241,168 B2 | 7/2007 | Sakurai et al. |
| 7,258,562 B2 | 8/2007 | Daily et al. |
| D550,158 S | 9/2007 | Victor |
| D550,628 S | 9/2007 | Whiteman, Jr. et al. |
| 7,267,515 B2 | 9/2007 | Lappohn |
| 7,270,574 B1 | 9/2007 | Ngo |
| 7,273,382 B2 | 9/2007 | Igarashi et al. |
| 7,278,856 B2 | 10/2007 | Minich |
| 7,281,950 B2 | 10/2007 | Belopolsky |
| D554,591 S | 11/2007 | Victor |
| 7,292,055 B2 | 11/2007 | Egitto |
| 7,303,427 B2 | 12/2007 | Swain |
| 7,309,239 B2 | 12/2007 | Shuey et al. |
| 7,316,585 B2 | 1/2008 | Smith et al. |
| 7,322,855 B2 | 1/2008 | Mongold et al. |
| 7,331,802 B2 | 2/2008 | Rothermel et al. |
| 7,335,043 B2 | 2/2008 | Hgo et al. |
| 7,338,321 B2 | 3/2008 | Laurx |
| 7,344,383 B1 * | 3/2008 | Lu et al. .................. 439/71 |
| 7,347,740 B2 | 3/2008 | Minich |
| 7,351,071 B2 | 4/2008 | Korsunsky et al. |
| 7,381,092 B2 | 6/2008 | Nakada |
| 7,384,289 B2 | 6/2008 | Minich |
| 7,384,311 B2 | 6/2008 | Sharf et al. |
| 7,402,064 B2 | 7/2008 | Daily |
| 7,407,387 B2 | 8/2008 | Johnescu |
| 7,422,483 B2 | 9/2008 | Avery et al. |
| 7,425,145 B2 | 9/2008 | Ngo et al. |
| 7,429,176 B2 | 9/2008 | Johnescu |
| 7,445,457 B1 | 11/2008 | Frangioso, Jr. et al. |
| 7,452,242 B2 | 11/2008 | Poh et al. |
| 7,452,249 B2 | 11/2008 | Daily |
| 7,458,839 B2 | 12/2008 | Ngo |
| 7,467,955 B2 | 12/2008 | Raistrick et al. |
| 7,476,108 B2 | 1/2009 | Swain |
| 7,497,735 B2 | 3/2009 | Belopolsky |
| 7,497,736 B2 | 3/2009 | Minich et al. |
| 7,500,871 B2 | 3/2009 | Minich et al. |
| 7,503,804 B2 | 3/2009 | Minich |
| 7,541,135 B2 | 6/2009 | Swain |
| 7,549,897 B2 | 6/2009 | Fedder et al. |
| 7,553,182 B2 | 6/2009 | Buck et al. |
| 7,588,463 B2 | 9/2009 | Yamada et al. |
| 7,621,781 B2 | 11/2009 | Rothermel et al. |
| D607,822 S | 1/2010 | Dennes |
| D611,908 S | 3/2010 | Takada et al. |
| 7,708,569 B2 | 5/2010 | Sercu et al. |
| D618,180 S | 6/2010 | Gross et al. |
| D618,181 S | 6/2010 | Gross et al. |
| 7,753,731 B2 | 7/2010 | Cohen et al. |
| 7,762,843 B2 | 7/2010 | Minich et al. |
| D626,075 S | 10/2010 | Truskett et al. |
| D628,963 S | 12/2010 | Sau et al. |
| 7,883,366 B2 | 2/2011 | Davis et al. |
| 7,976,326 B2 | 7/2011 | Stoner |
| 7,988,456 B2 | 8/2011 | Davis et al. |
| 8,011,957 B2 | 9/2011 | Pan |
| D651,177 S | 12/2011 | Luo |
| 8,079,847 B2 | 12/2011 | Davis et al. |
| D653,621 S | 2/2012 | Gross et al. |
| 8,109,770 B2 | 2/2012 | Perugini et al. |
| 8,231,415 B2 | 7/2012 | Johnescu et al. |
| 8,277,241 B2 | 10/2012 | Horchler et al. |
| 8,366,485 B2 | 2/2013 | Johnescu et al. |
| 8,374,470 B2 * | 2/2013 | Ban et al. .................. 385/49 |
| 8,408,939 B2 | 4/2013 | Davis et al. |
| 8,414,199 B2 * | 4/2013 | Ishigami .................. 385/93 |
| 8,465,213 B2 * | 6/2013 | Tamura et al. .................. 385/92 |
| 8,480,413 B2 | 7/2013 | Minich et al. |
| RE44,556 E | 10/2013 | Minich |
| 8,632,263 B2 * | 1/2014 | Nekado et al. .................. 385/92 |
| 2001/0003685 A1 | 6/2001 | Aritani |
| 2001/0008189 A1 | 7/2001 | Reede |
| 2001/0012729 A1 | 8/2001 | Van Woensel |
| 2001/0041477 A1 | 11/2001 | Billman et al. |
| 2001/0046810 A1 | 11/2001 | Cohen et al. |
| 2001/0046816 A1 | 11/2001 | Saito et al. |
| 2002/0013101 A1 | 1/2002 | Long |
| 2002/0039857 A1 | 4/2002 | Naito et al. |
| 2002/0084105 A1 | 7/2002 | Geng et al. |
| 2002/0098727 A1 | 7/2002 | McNamara et al. |
| 2002/0106930 A1 | 8/2002 | Pape et al. |
| 2002/0106932 A1 | 8/2002 | Holland et al. |
| 2002/0111068 A1 | 8/2002 | Cohen et al. |
| 2002/0127903 A1 | 9/2002 | Billman et al. |
| 2002/0142629 A1 | 10/2002 | Zaderej et al. |
| 2002/0142676 A1 | 10/2002 | Hosaka et al. |
| 2002/0159235 A1 | 10/2002 | Miller et al. |
| 2002/0173177 A1 | 11/2002 | Korsunsky |
| 2002/0187688 A1 | 12/2002 | Marvin et al. |
| 2002/0193019 A1 | 12/2002 | Blanchfield et al. |
| 2003/0116857 A1 | 6/2003 | Taniguchi et al. |
| 2003/0119378 A1 | 6/2003 | Avery |
| 2003/0143894 A1 | 7/2003 | Kline et al. |
| 2003/0171010 A1 | 9/2003 | Winings et al. |
| 2003/0203665 A1 | 10/2003 | Ohnishi et al. |
| 2003/0219999 A1 | 11/2003 | Minich et al. |
| 2003/0220021 A1 | 11/2003 | Whiteman, Jr. et al. |
| 2003/0236035 A1 | 12/2003 | Kuroda et al. |
| 2004/0018757 A1 | 1/2004 | Lang et al. |
| 2004/0038590 A1 | 2/2004 | Lang et al. |
| 2004/0072470 A1 | 4/2004 | Lang et al. |
| 2004/0077224 A1 | 4/2004 | Marchese |
| 2004/0087196 A1 | 5/2004 | Lang et al. |
| 2004/0114866 A1 | 6/2004 | Hiramatsu |
| 2004/0157477 A1 | 8/2004 | Johnson et al. |
| 2004/0224559 A1 | 11/2004 | Nelson et al. |
| 2004/0235321 A1 | 11/2004 | Mizumura et al. |
| 2004/0259420 A1 | 12/2004 | Wu |
| 2005/0009402 A1 | 1/2005 | Chien et al. |
| 2005/0026503 A1 | 2/2005 | Trout et al. |
| 2005/0032401 A1 | 2/2005 | Kobayashi |
| 2005/0048838 A1 | 3/2005 | Korsunsky et al. |
| 2005/0079763 A1 | 4/2005 | Lemke et al. |
| 2005/0101166 A1 | 5/2005 | Kameyama |
| 2005/0101188 A1 | 5/2005 | Benham et al. |
| 2005/0112952 A1 | 5/2005 | Wang et al. |
| 2005/0118869 A1 | 6/2005 | Evans |
| 2005/0170700 A1 | 8/2005 | Shuey et al. |
| 2005/0196987 A1 | 9/2005 | Shuey et al. |
| 2005/0202722 A1 | 9/2005 | Regnier et al. |
| 2005/0215121 A1 | 9/2005 | Tokunaga |
| 2005/0227552 A1 | 10/2005 | Yamashita et al. |
| 2005/0277315 A1 | 12/2005 | Mongold et al. |
| 2005/0287869 A1 | 12/2005 | Kenny et al. |

(56) References Cited

U.S. PATENT DOCUMENTS

| | | |
|---|---|---|
| 2006/0003620 A1 | 1/2006 | Daily et al. |
| 2006/0014433 A1 | 1/2006 | Consoli et al. |
| 2006/0024983 A1 | 2/2006 | Cohen et al. |
| 2006/0024984 A1 | 2/2006 | Cohen et al. |
| 2006/0046526 A1 | 3/2006 | Minich |
| 2006/0051987 A1 | 3/2006 | Goodman et al. |
| 2006/0068610 A1 | 3/2006 | Belopolsky |
| 2006/0068641 A1 | 3/2006 | Hull et al. |
| 2006/0073709 A1 | 4/2006 | Reid |
| 2006/0116857 A1 | 6/2006 | Sevic et al. |
| 2006/0121749 A1 | 6/2006 | Fogg |
| 2006/0128197 A1 | 6/2006 | McGowan et al. |
| 2006/0141818 A1 | 6/2006 | Ngo |
| 2006/0183377 A1 | 8/2006 | Sinsheimer |
| 2006/0192274 A1 | 8/2006 | Lee et al. |
| 2006/0216969 A1 | 9/2006 | Bright et al. |
| 2006/0228912 A1 | 10/2006 | Morlion et al. |
| 2006/0232301 A1 | 10/2006 | Morlion et al. |
| 2006/0281354 A1 | 12/2006 | Ngo et al. |
| 2007/0004287 A1 | 1/2007 | Marshall |
| 2007/0021002 A1 | 1/2007 | Laurx et al. |
| 2007/0042639 A1 | 2/2007 | Manter et al. |
| 2007/0071391 A1 | 3/2007 | Mazotti et al. |
| 2007/0099455 A1 | 5/2007 | Rothermel et al. |
| 2007/0099512 A1 | 5/2007 | Sato |
| 2007/0183707 A1 | 8/2007 | Umezawa |
| 2007/0183724 A1 | 8/2007 | Sato |
| 2007/0202715 A1 | 8/2007 | Daily et al. |
| 2007/0202747 A1 | 8/2007 | Sharf et al. |
| 2007/0205774 A1 | 9/2007 | Minich |
| 2007/0207641 A1 | 9/2007 | Minich |
| 2007/0293084 A1 | 12/2007 | Ngo |
| 2008/0032524 A1 | 2/2008 | Lemke et al. |
| 2008/0045079 A1 | 2/2008 | Minich et al. |
| 2008/0176453 A1 | 7/2008 | Minich et al. |
| 2008/0232737 A1 | 9/2008 | Ishigami et al. |
| 2008/0246555 A1 | 10/2008 | Kirk et al. |
| 2008/0248670 A1 | 10/2008 | Daily et al. |
| 2008/0316729 A1 | 12/2008 | Rothermel et al. |
| 2009/0011643 A1 | 1/2009 | Amleshi et al. |
| 2010/0055983 A1 | 3/2010 | Wu |
| 2010/0093209 A1 | 4/2010 | Liu et al. |
| 2010/0216342 A1 | 8/2010 | Lin |
| 2010/0240233 A1 | 9/2010 | Johnescu et al. |
| 2010/0291803 A1 | 11/2010 | Kirk |
| 2011/0159744 A1 | 6/2011 | Buck |
| 2011/0195593 A1 | 8/2011 | McGrath et al. |
| 2012/0214343 A1 | 8/2012 | Buck et al. |
| 2012/0289095 A1 | 11/2012 | Kirk |
| 2013/0005160 A1 | 1/2013 | Minich |
| 2013/0122744 A1 | 5/2013 | Morgan et al. |
| 2013/0149881 A1 | 6/2013 | Johnescu et al. |
| 2013/0149890 A1 | 6/2013 | Schroll et al. |
| 2013/0210246 A1 | 8/2013 | Davis et al. |
| 2013/0273756 A1 | 10/2013 | Stoner et al. |
| 2013/0273781 A1 | 10/2013 | Buck et al. |
| 2014/0017957 A1 | 1/2014 | Horchler et al. |

FOREIGN PATENT DOCUMENTS

| | | |
|---|---|---|
| DE | 3605316 | 8/1987 |
| DE | 4040551 | 4/1993 |
| DE | 10226279 | 11/2003 |
| DE | 102010005001 | 8/2010 |
| EP | 0212764 | 3/1987 |
| EP | 0273683 | 7/1988 |
| EP | 0337634 | 10/1989 |
| EP | 0442785 | 8/1991 |
| EP | 0486298 | 5/1992 |
| EP | 0321257 | 4/1993 |
| EP | 0560550 | 9/1993 |
| EP | 0562691 | 9/1993 |
| EP | 0591772 | 4/1994 |
| EP | 0623248 | 11/1995 |
| EP | 0706240 | 4/1996 |
| EP | 0782220 | 7/1997 |
| EP | 0789422 | 8/1997 |
| EP | 0843383 | 5/1998 |
| EP | 0635910 | 6/2000 |
| EP | 1024556 | 8/2000 |
| EP | 1111730 | 6/2001 |
| EP | 0891016 | 10/2002 |
| EP | 1091449 | 9/2004 |
| EP | 1148587 | 4/2005 |
| GB | 1162705 | 8/1969 |
| JP | 57/058115 | 4/1982 |
| JP | 60/072663 | 4/1985 |
| JP | 02/278893 | 11/1990 |
| JP | 05/21119 | 1/1993 |
| JP | 05344728 | 12/1993 |
| JP | 0668943 | 3/1994 |
| JP | 06236788 | 8/1994 |
| JP | 07114958 | 5/1995 |
| JP | 07169523 | 7/1995 |
| JP | 0896919 | 4/1996 |
| JP | 08125379 | 5/1996 |
| JP | 09199215 | 7/1997 |
| JP | 11185886 | 7/1999 |
| JP | 2000/003743 | 1/2000 |
| JP | 2000/003744 | 1/2000 |
| JP | 2000/003745 | 1/2000 |
| JP | 2000/003746 | 1/2000 |
| JP | 2000/228243 | 8/2000 |
| JP | 2001/135388 | 5/2001 |
| JP | 2001/305182 | 10/2001 |
| JP | 2002/008790 | 1/2002 |
| JP | 2003/217785 | 7/2003 |
| JP | 2007/128706 | 5/2007 |
| KR | 100517561 | 9/2005 |
| TW | 576555 | 8/1990 |
| TW | 546872 | 8/2003 |
| WO | WO 90/16093 | 12/1990 |
| WO | WO 96/38889 | 12/1996 |
| WO | WO 96/42123 | 12/1996 |
| WO | WO 97/20454 | 6/1997 |
| WO | WO 97/43885 | 11/1997 |
| WO | WO 97/44859 | 11/1997 |
| WO | WO 97/45896 | 12/1997 |
| WO | WO 98/15989 | 4/1998 |
| WO | WO 00/16445 | 3/2000 |
| WO | WO 01/29931 | 4/2001 |
| WO | WO 01/39332 | 5/2001 |
| WO | WO 02/058191 | 7/2002 |
| WO | WO 02/101882 | 12/2002 |
| WO | WO 02/103847 | 12/2002 |
| WO | WO 2005/065254 | 7/2005 |
| WO | WO 2006/031296 | 3/2006 |
| WO | WO 2006/105535 | 10/2006 |
| WO | WO 2007/064632 | 6/2007 |
| WO | WO 2008/082548 | 7/2008 |
| WO | WO 2008/117180 | 10/2008 |
| WO | WO 2012/047619 | 4/2012 |
| WO | WO 2012/174120 | 12/2012 |

OTHER PUBLICATIONS

U.S. Appl. No. 29/418,310, filed Apr. 13, 2012, Buck et al.
European Patent Application No. 12305119.5: Search Report dated Jul. 11, 2012, 5 pages.
International Patent Application No. PCT/US2013/035915: International Search Report dated Jul. 25, 2013, 17 pages.
Berg Electronics Catalog, p. 13-96, Solder Washers, 1996, 1 page.
IBM Technical Disclosure Bulletin, 1972, 14(8), 2 pages.
IBM Technical Disclosure Bulletin, 1977, 20(2), 2 pages.
IBM Technical Disclosure Bulletin, 1990, 32(11), 2 pages.
Kazmierowicz, "Profiling Your Solder Reflow Oven in Three Passes or Less", KIC Oven Profiling, Surface Mount Technology, 1990, 2 pages.
Kazmierowicz, "The Science Behind Conveyor Oven Thermal Profiling", KIC Oven Profiling, Surface Mount Technology, 1990, 9 pages.
"Micro Electronic Interconnects", Alphametals, 1990, 4 pages.

(56) References Cited

OTHER PUBLICATIONS

Research Disclosure, Kenneth Mason Publications Ltd., England, Aug. 1990, No. 316, 1 page.
Research Disclosure, Kenneth Mason Publications Ltd., England, Oct. 1992, No. 342, 1 page.
Siemens, "SpeedPac: A New Concept for the Next Generation of Transmission Speed," Backplane Interconnection, Issue Jan. 1996.
U.S. Appl. No. 29/418,313, filed Apr. 13, 2012, Zerebilov et al.
U.S. Appl. No. 29/426,921, filed Jul. 11, 2012, Horchler.
U.S. Appl. No. 29/444,125, filed Jan. 25, 2013, Harper Jr. et al.
U.S. Appl. No. 29/449,794, filed Mar. 15, 2013, Zerebilov et al.
"1.0 HDMI Right Angle Header Assembly (19 Pin) Lead Free", Molex Incorporated, Jul. 20, 2004, 7 pages.
"1.90 by 1.35mm (.075 by.053) Pitch Impact, Backplane Connector System 3 and 4 Pair, Features and Specification", Molex, www.molex.com/link/Impact.html, 2008, 5 pages.
"4.0 UHD Connector Differential Signal Crosstalk, Reflections", 1998, p. 8-9.
Ahn et al., "A Design of the Low-Pass Filter Using the Novel Microstrip Defected Ground Structure", IEEE Transactions on Microwave Theory and Techniques, 2001, 49(1), 86-93.
"AMP Z-Dok and Z-Dok and Connectors", Tyco Electronics/AMP, Application Specification #114-13068, Aug. 30, 2005, 17 pages.
"AMP Z-Pack 2mm HM Connector, 2mm Centerline, Eight-Row, Right-Angle Applications", Electrical Performance Report, EPR 889065, Issued Sep. 1998, 59 pages.
"AMP Z-Pack 2mm HM Interconnection System", 1992/1994, AMP Incorporated, 6 pages.
"AMP Z-Pack HM-Zd Performance at Gigabit Speeds", Tyco Electronics, Report #20GC014, Rev.B., May 4, 2001, 32 pages.
"B.? Bandwidth and Rise Time Budgets, Module 1-8 Fiber Optic Telecommunications (E-XVI-2a)", http:-cord.org-step_online-st1-8-st18exvi2a.htm, 2006, 1-3.
"Backplane Connectors", http://www.amphenol-tcs.com/products/connectors/backplane/index.html, Amphenol TCS (ATCS), Jun. 19, 2008, 1-3.
"Champ Z-Dok Connector System", Tyco Electronics, Jan. 2002, 3 pages.
Chen et al., "Characteristics of Coplanar Transmission Lines on Multilayer Substrates: Modeling and Experiments", IEEE Transactions on Microwave Theory and Techniques, Jun. 1997, 45(6), 939-945.
Cheng et al., "'Terahertz-Bandwidth Characteristics of Coplanar Transmission Lines on Low Permittivity Substrates", IEEE Transactions on Microwave Theory and Techniques, 1994, 42(12), 2399-2406.
Chua et al., "'Broadband Characterisation of CPW Transition and Transmission Line Parameters for Small Reflection Up to 100 GHZ", RF and Microwave Conference, 2004, 269-271.
"Daughtercard Hole Pattern: Signal Modules (10 & 25 positions) Connector Assembly", Customer No. C-163-5101-500, Teradyne Connection Systems, Inc., 2001, 1 page.
Derman "Speed, Density Push Design Xomplexities," Electronic Engineering Times, May 1998, 2 pages.
European Patent Application No. 12305119.5: European Search Report dated Jul. 11, 2012, 5 pages.
European Patent Application No. 10753953.8: Extended European Search Report dated Nov. 7, 2013, 6 pages.
"FCI's Airmax VS Connector System Honored at DesignCon 2005", http:--www.heilind.com-products-fci-airmax-vs-design.asp, Heilind Electronics, Inc., 2005, 1 page.
Finan, "Thermally Conductive Thermoplastics", LNP Engineering Plastics, Inc., Plastics Engineering 2000, www.4spe.org, 4 pages.
"Framatome Connector Specification", May 10, 1999, 1 page.
Fusi et al., "Differential Signal Transmission through Backplanes and Connectors", Electronic Packaging and Production, Mar. 1996, 27-31.
"GbXI-Trac Backplane Connector System", www.molex.com/cgi-bin, Molex, 2007, 1-3.

"Gig-Array Connector System, Board to Board Connectors", 2005, 4 pages.
"Gig-Array High Speed Mezzanine Connectors 15-40 mm Board to Board", FCI Corporation, Jun. 5, 2006, 1 page.
Goel et al., "AMP Z-Pack Interconnect System", AMP Incorporated, 1990, 9 pages.
"HDM Separable Interface Detail", Molex, Feb. 17, 1993, 3 pages.
"HDM Stacker Signal Integrity", http://www.teradyne.com/prods/tcs/producsts/connectors/mezzanine/hdm_stacker/signintegrity.html, Amphenol TCS (ATCS), Feb. 2, 2006, 3 pages.
"HDM, HDM Plus Connectors", http:--www.teradyne.com-prods-tcs-products-connectors-backplane-hdm-index.html, Amphenol TCS, 2006, 1 page.
"HDM/HDM Plus, 2mm, Backplane Interconnection System", Teradyne Connection Systems, 1993, 22 pages.
Hettak et al., "Simultaneous Realization of Millimeter Wave Uniplanar Shunt Stubs and DC Block", IEEE MTT-S Digest, 1998, 809-812.
"High Definition Multimedia Interface (HDMI)", www,molex.com, Molex, Jun. 19, 2008, 2 pages.
"High Speed Backplane Interconnect Solutions", Tyco Electronics, 2007, 6 pages.
"High Speed Characterization Report, SEAM-30-02.0-S-10-2", www.samtec.com, SAMTEC, 2005, 55 pages.
"Honda High-Speed Backplane Connector NSP Series", Honda Connectors, Feb. 7, 2003, 25 pages.
Hult, "FCI's Problem Solving Approach Changes Market, The FCI Electronics AirMax VS", http:--www.connecotrsupplier.com-tech_updates_FCI-Airmax_archive.htm, ConnectorSupplier.com, 2006, 1-4.
Hunsaker, "Ventura Application Design", TB-2127, Amphenol, Aug. 25, 2005, 13 pages.
"Impact 3 Pair 10 Column Signal Module", Tyco Electronics, Mar. 25, 2008, 1 page.
"Impact 3 Pair Header Unguided Open Assembly", Tyco Electronics, Apr. 11, 2008, 1 page.
"Impact Connector Offered by Tyco Electronic, High Speed Backplane Connector System", Tyco Electronics, Apr. 15, 2008, 12 pages.
International Application No. PCT/U82003/014370, International Search Report dated Aug. 6, 2003, 2 pages.
International Application No. PCT/US2010/040899, International Search Report dated Jan. 25, 2011, 2 pages.
International Patent Application No. PCT/US2013/035775: International Search Report dated Jul. 18, 2013, 3 pages.
International Patent Application No. PCT/US2013/035915: International Search Report and Written Opinion dated Jul. 25, 2013, 17 pages.
International Patent Application No. PCT/US2013/049995: International Search Report dated Oct. 28, 2013, 18 pages.
Lee et al., "Characteristic of the Coplanar Waveguide to Microstrip Right-Angled Transition", Department of Electronics Engineering, 1998, 3 pages.
Leung et al., "Low-Loss Coplanar Waveguides Interconnects on Low-Resistivity Silicon Substrate", IEEE Transactions on Components and Packaging Technologies, 2004, 27(3), 507-512.
Lim et al., "A Spiral-Shaped Defected Ground Structure for Coplanar Waveguide", IEEE Microwave and Wireless Components Letters, 2002, 12(9), 330-332.
"Lucent Technologies' Bell Labs and FCI Demonstrate 25gb-S Data Transmission Over Electrical Backplane Connectors", http:--www.lucent.com-press-0205-050201,bla.html, Lucent Tech Bell Labs, Feb. 1, 2005,1-4.
Machac et al., "Space Leakage of Power from Uniplanar Transmission Lines", Czech Technical University, 565-568.
Mao et al., "Characterization of Coplanar Waveguide Open End Capacitance-Theory and Experiment", IEEE Transactions on Microwave Theory and Techniques, 1994, 42(6), 1016-1024.
"Metrel 1000 Series, 5 Row Receptacle, Right Angle, Press Fit, PCB Mounted Receptacle Assembly", FCI 2001, 1 page.
"Metrel 2mm High-Speed Connectors, 1000, 2000, 3000 Series, Electrical Performance Data for Differential Applications", FCI Framatome Group, 2000, 2 pages.

(56) References Cited

OTHER PUBLICATIONS

"Metrel Speed & Density Extensions", FCI, Jun. 3, 1999, 1-25.
"Mezzanine High Speed High-Density Connectors Gig-Array and Meg-Array Electrical Performance Data", FCI Corporation, 10 pages.
"MILLIPACS Connector, Type A Specification", Dec. 14, 2004, 1 page.
Mottonen et al., "Novel Wide-Band Coplanar Waveguide-to-Rectangular Waveguide Transition", IEEE Transactions on Microwave Theory and Techniques, 2004, 52(8), 1836-1842.
Nadolny et al., "Optimizing Connector Selection for Gigabit Signal Speeds", http:--www.ecnmag.com-article-CA45245, ECN, Sep. 1, 2000, 6 pages.
"NSP Series, Backplane High-Speed Data Transmission Cable Connectors", http:--www.honda-connector.co.jp, Honda Connectors, 2006, 6 pages, English Translation attached.
Ogando, "And now—An Injection-Molded Heat Exchanger", Sure, plastics are thermal insulators, but additive packages allow them to conduct heat instead, Global Design News, Nov. 1, 2000, 4 pages.
"Open Pin Field Array Seaf Series", www.samtec.com, SAMTEC, 2005, 1 page.
"Overview for High Density Backplane Connector (Z-Pack Tin-Man)", Tyco Electronics, 2008, 1 page.
"Overview for High Density Backplane Connectors (Impact) Offered by Tyco Elecctronics", www.tycoelectronics,com/catalog, Tyco Electronics, 2007, 1-2.
"Overview: Backplane Products", http:--www.molex.com-cgi-bin-bv-molex-super_family-super_family.jsp?BV_SessionID=@, Molex, Feb. 8, 2006, 4 pages.
"PCB-Mounted Receptacle Assemblies, 2.00 mm (0.079 In) Centerlines, Right-Angle Solder-to-Board Signal Receptacle", Metrel, Berg Electronics, 2 pages.
Power TwinBlade I/O Cable Connector RA-North-South, No. GS-20_072, Aug. 6, 2007, 11 pages.
"Product Datasheets, 10 Bgit/s XENPAK 850 nm Transponder (TRP10GVP2045)", MergeOptics GmbH, 2005, 13 pages.
"Product Datasheets, Welcome to XENPAK.org.", http://www.xenpak.org., 2001, 1 page.
Sherman, "Plastics that Conduct Heat", Plastics Technology Online, Jun. 2001, http://www.plasticstechnology.com, 4 pages.
Soliman. et al., "Multimodel Characterization of Planar Microwave Structures", IEEE Transactions on Microwave Theory and Techniques, 2004, 52(1), 175-182.
Son et al., "Picosecond Pulse Propagation on Coplanar Striplines Fabricated on Lossy Semiconductor Substrates: Modeling and Experiments", IEEE Transactions on Microwave Theory and Techniques, 1993, 41(9), 1574-1580.
Straus, "Shielded In-Line Electrical Multiconnector", IBM Technical Disclosure Bulletin, Aug. 3, 1967, 10(3), 3 pages.
Suh et al., "Coplanar Strip line Resonators Modeling and Applications to Filters", IEEE Transactions on Microwave Theory and Techniques, 2002, 50(5), 1289-1296.
"Two-Piece, High-Speed Connectors", www.tycoelectronics.com/catalog, Tyco Electronics, 2007, 1-3.
"Tyco Unveils Z-Pack TinMan Orthogonal Connector System", http://www.epn-online.com/page/new59327/tyco-unveils-z-pack-orthogonal-conn, Oct. 13, 2009, 4 pages.
Tzuang et al., "Leaky Mode Perspective on Printed Antenna", Proc. Natl. Sci. Counc. ROC(A), 1999, 23(4), 544-549.
"Ventura High Performance, Highest Density Available", http://www.amphenol-tcs.com/products/connectors/backplane/ventura/index.html, Amphenol TCS (ATCS), Jun. 19, 2008, 1-2.
"VHDM Connector", http://www.teradyne.com/prods/tcs/products/connectors/backplane/vhdm/index.html, Amphenol TCS (ATCS), Jan. 31, 2006, 2 pages.
"VHDM Daughterboard Connectors Feature Press-Fit Terminations and a Non-Stubbing Separable Interface", Teradyne, Inc. Connections Sys Div, Oct. 8, 1997, 46 pages.
"VHDM High-Speed Differential (VHDM HSD)", http://www.teradyne.com/prods/bps/vhdm/hsd.html, Teradyne, Jan. 24, 2000, 6 pages.
"VHDM L-Series Connector", http://www.teradyne.com/prods/tcs/products/connectors/backplane/vhdm_1-series/index.html, Amphenon TCS(ATCS), 2006, 4 pages.
Weller et al., "High Performance Microshield Line Components", IEEE Transactions on Microwave Theory and Techniques, 1995, 43(3), 534-543.
Williams et al., "Accurate Transmission Line Characterization", IEEE Microwave and Guided Wave Letters, 1993, 3(8), 247-249.
Wu et al., "'Full-Wave Characterization of the Mode Conversion in a Coplanar Waveguide Right-Angled Bend", IEEE Transactions on Microwave Theory and Techniques, 1995, 43(11), 2532-2538.
"XCede® Connector", http://www.amphenol-tcs.com/products/connectors/backplane/xcede/index.html, Amphenol TCS (ATCS), Jun. 19, 2008, 1-5.
Ya et al., "Microstrip and Slotline Two-Pole Microwave Filters with Additional Transmission Zeros", Int. Crimean Conference, Microwave & Telecommunication Technology, 2004, 405-407 (English Abstract provided).
"Z-Dok and Connector", http://2dok.tyco.electronics.com, Tyco Electronics, May 23, 2003, 1-15.
"Z-Pack Slim UHD", http:/ww.zpackuhd.com, Tyco Electronics, 2007, 8 pages.
"Z-Pack TinMan High Speed Orthogonal Connector Product Feature Selector", Tyco Electronics, 2009, 2 pages.
"Z-Pack TinMan Product Portfolio Expanded to Include 6-Pair Module", Tyco Electronics, Jun. 19, 2008, 1 page.

\* cited by examiner

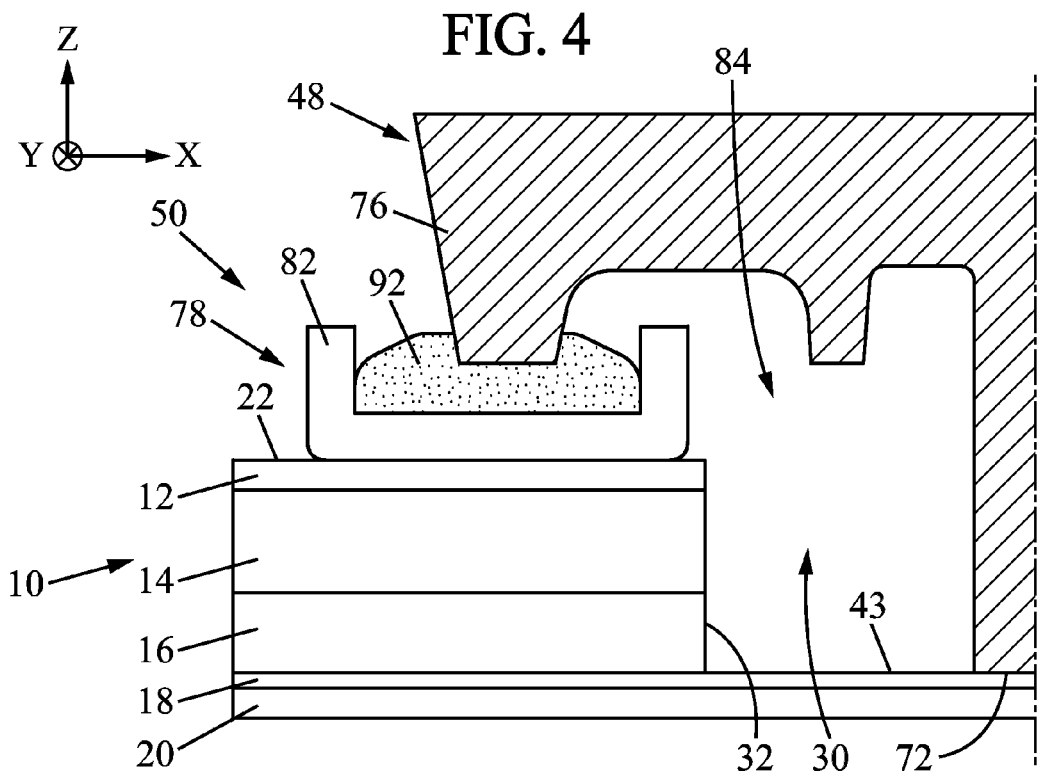
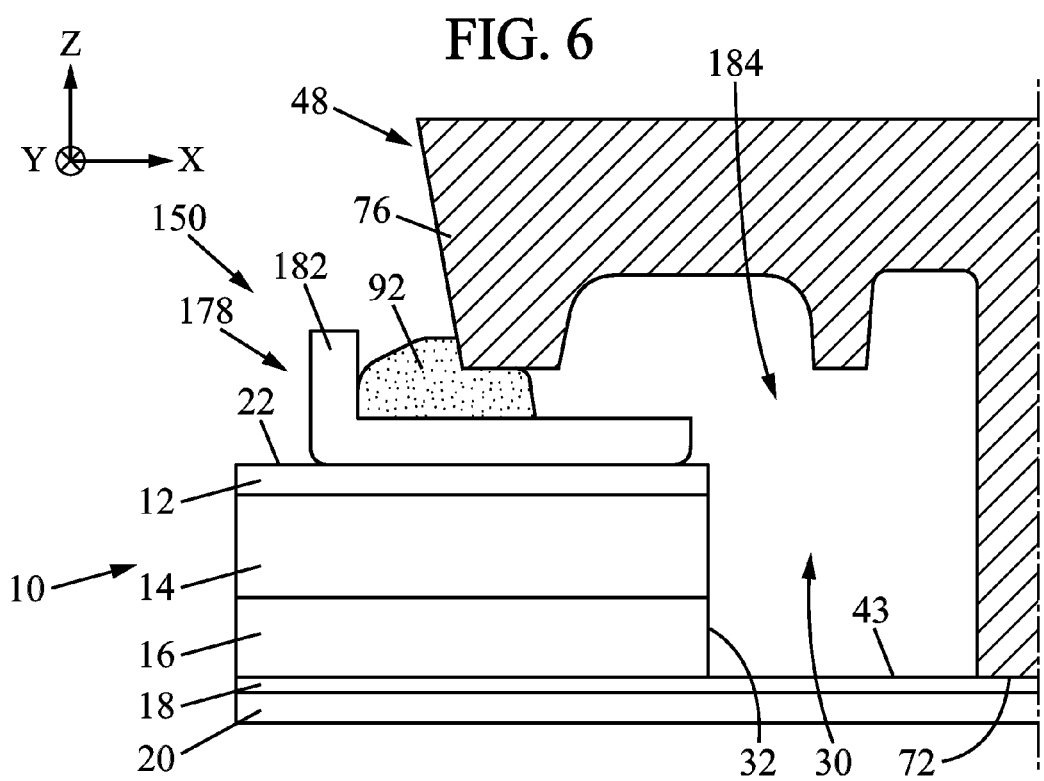

DISMOUNTABLE OPTICAL COUPLING DEVICE

CROSS-REFERENCE TO RELATED APPLICATIONS

This claims priority to European Patent Application Serial No. 12305119.5, filed on Jan. 31, 2012, the disclosure of which is hereby incorporated by reference as if set forth in its entirety herein

FIELD OF THE INVENTION

The instant invention relates to optical coupling devices.

BACKGROUND OF THE INVENTION

Most communication systems involve a number of system-cards. Such cards are usually manufactured as so-called printed circuit boards (PCBs).

Because of the ever increasing requirements in data rates, due for example to the Internet, the limits of using electrical communications are being reached. It has become difficult to guarantee good signal integrity over the electrical lines.

To respond to this bandwidth demand, high speed systems are now being built with an optical layer (an optical fibre or a planar waveguide) incorporated in replacement of the electrically-conducting metal. Indeed, light does not suffer from the same limitations as electricity.

Optical coupling devices are usually used to interconnect an optical layer of a PCB, or so-called optical circuit board (OCB), with an external optical device.

In order to ensure efficient transfer of light through the optical coupling device, a very precise positioning of it along a vertical direction with respect to the optical circuit board is necessary. Then, a fixation part of the optical coupling device is glued to a fixation surface of the optical circuit board.

However, after gluing, repositioning, rework or change of the optical coupling device, requested in particular if misalignment occurs, are very difficult to carry out, not to say impossible.

SUMMARY OF THE INVENTION

It is an object of the present invention to improve the fixation of an optical coupling device to an optical circuit board.

To this aim, it is provided an optical communication system according to claim 1.

With these features, it is provided a dismountable optical coupling device which can be easily removed from the optical circuit board in case of misalignment, for repositioning, rework or change purposes.

In some embodiments of the invention, one might also use one or more of the features defined in the claims.

BRIEF DESCRIPTION OF THE DRAWINGS

Other characteristics and advantages of the invention will readily appear from the following description of several of its embodiments, provided as non-limitative examples, and of the accompanying drawings.

On the drawings:

FIG. 4 is a partial cross-sectional view along line IV-IV of FIG. 1 illustrating the optical communication system in an assembled state, FIG. 6 is a view similar to that of FIG. 4 with the support element of FIG. 5.

On the different Figures, the same reference signs designate like or similar elements.

DETAILED DESCRIPTION

Figure 1:
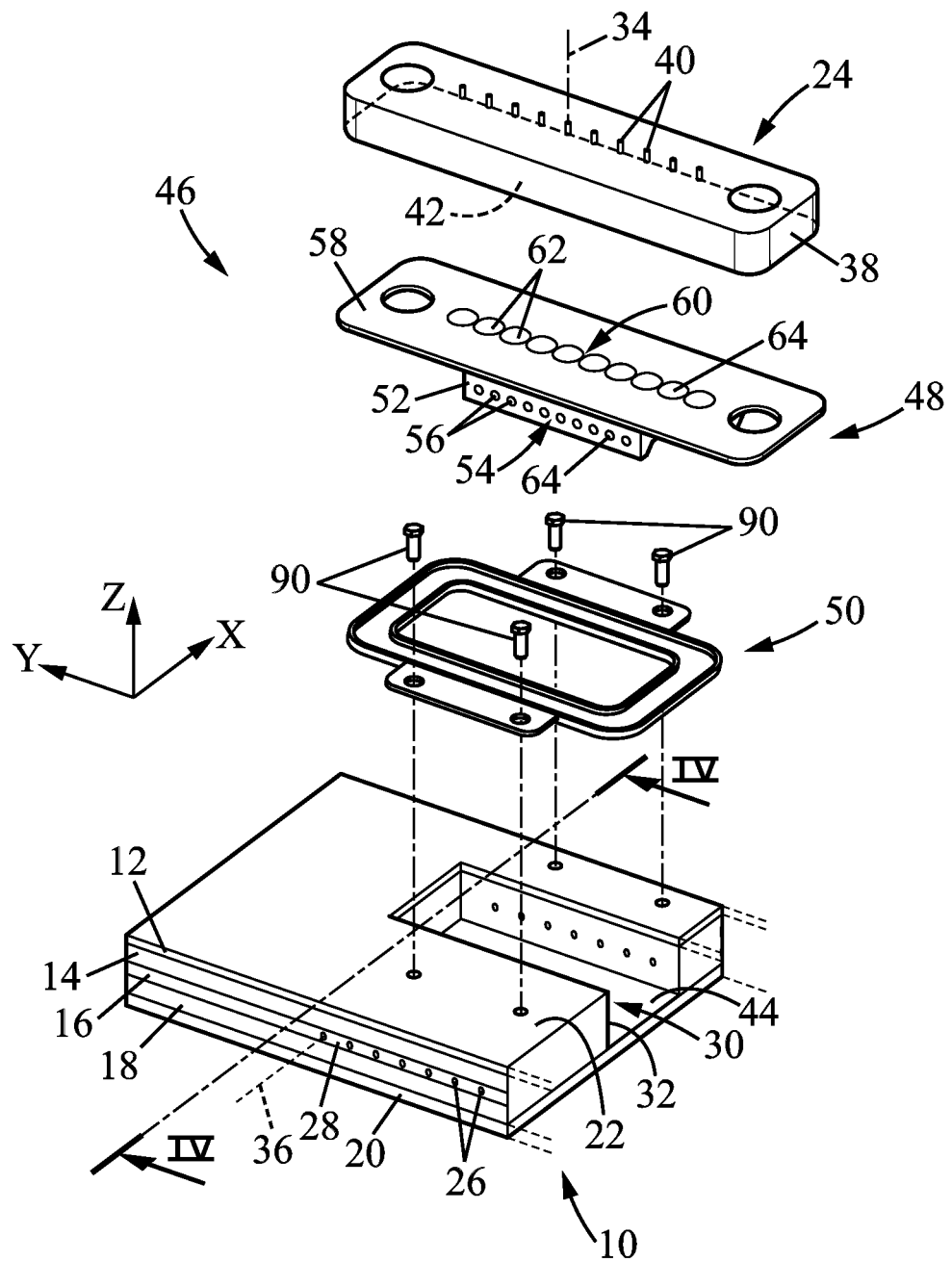
FIG. 1 is a partial exploded perspective top view of an optical communication system according to the invention.

FIG. 1 partially shows a hybrid or full optical PCB 10, for example a backplane, which is a layer stack comprising a plurality of layers.

In particular, this layer stack 10 comprises, from top to bottom, a copper layer 12, a pre-preg layer 14, an optical layer 16, and further copper 18 and pre-preg 20 layers.

The terms "top", "bottom", "up", "down" and the like are given in reference to direction Z, normal to the top surface 22 of the PCB 10 and pointing toward a mating optical device 24 to be optically coupled to the PCB 10.

The top surface 22 of the PCB 10 extends parallel to an XY plane, directions X and Y being artificially defined. For example, direction X corresponds to the direction of propagation of light in the optical layer 16 and direction Y corresponds to the direction transverse thereto.

The optical layer 16 is made of a plurality of tubes 26 integrated or embedded in a body 28 having a lower refractive index than the tubes 26. Thus, the tubes 26 and the body 28 constitute respectively the cores and the cladding of waveguides. Embedded waveguides formed by the tubes 26 may be polymer waveguides, glass sheet waveguides or waveguides obtained by embedded fibre technology or the like.

As can be seen on FIG. 1, a cut-out 30 is formed in the PCB 10. In particular, the cut-out 30 is shaped with a very simple form of a right parallelepiped and is defined by straight walls.

The wall where the tubes 26 mouth into the cut-out 30 defines an optical interface 32 of the PCB 10. Namely, all cores 26 mouth into the cut-out 30 to define the optical interface 32 of the PCB 10.

The optical interface 32 of the PCB 10 comprises discrete light transmission regions arranged as a row. The spacing between the transmission regions along direction Y might be constant or not, depending on the requirements. For example, in the present drawing, the spacing between neighbour transmission regions is set constant to 250 μm.

In a variant, the PCB 10 comprises discrete light transmission regions forming a plurality of rows arranged along direction Z.

Optical signals, transferred to or from the mating optical device 24, such as an optical device, an opto-electrical device or another PCB, are provided over a first optical path 34 to/from the cores 26 of the PCB 10, which core 26 provides a second optical path 36 for the optical signal parallel to the XY plane.

In the present example, the mating optical device 24 comprises a mechanical-transfer ferrule ("MT-ferrule") comprising a high precision sleeve 38 in which ends of optical fibres 40 extend in precisely defined relative locations. Thus, the mating optical device 24 has an optical interface 42 defined as the set of optic fibre ends directed toward the PCB 10. In the present drawing, the optical interface 42 of the mating optical device 24 extends parallel to the XY plane.

The optical interface 42 of the mating optical device 24 has the same number of transmission regions as the optical interface 32 of the PCB 10. Each transmission region of the optical interface 42 of the mating optical device 24 corresponds to a respective transmission region of the optical interface 32 of the PCB 10. This means that transmission regions are associated two by two and that light normally exited through the transmission region of one of the optical interfaces 32, 42 is to be transmitted to the corresponding transmission region of the other interface.

The PCB 10 further comprises a Z-reference. The Z-reference is a part of the PCB 10, the location of which along direction Z is precisely known with respect to the optical interface 32 of the PCB 10. For example, the Z-reference corresponds to the top surface 43 of the copper layer 18 (FIG. 4). However, other locations are possible, such as the bottom wall 44 of the cut-out 30, the top or bottom surface of the optical layer 16, depending on the processing of the optical layer 16 and the processing of the cut-out 30.

In order to achieve an optimal coupling between the first and second optical paths 34, 36, that are perpendicular to each other in the present example, an optical coupling system 46 is provided for alignment purposes.

The optical coupling system 46 comprises an optical coupling device 48 and a support element 50.

The optical coupling device 48 is provided as a single unitary component, although this is not necessarily always the case, and manufactured for example by moulding a translucent suitable material.

The optical coupling device 48 comprises a first face 52 defining a first optical interface 54 which is to be put in optical coupling with the optical interface 32 of the PCB 10. The first optical interface 54 has first transmission regions 56 which are to be placed opposite a corresponding transmission region of the optical interface 32 of the PCB 10. Hence, the arrangement of the first transmission regions 56 on the first optical interface 54 directly derives from that of the transmission regions of the optical interface 32, and it will not be described in further details here.

The optical coupling device 48 comprises a second top face 58 which, in the present case, extends normal to the first face 52, i.e. extends parallel to the XY plane. The second face 58 defines a second optical interface 60 which is to be put in optical coupling with the optical interface 42 of the mating optical device 24. The second optical interface 60 has second transmission regions 62 which are to be placed opposite a corresponding transmission region of the optical interface 42 of the mating optical device 24. Hence, the arrangement of the second transmission regions 62 on the second optical interface 60 directly derives from that of the transmission regions of the optical interface 42, and it will not be described in further details here.

An optical path is defined between the first and second optical interfaces 54, 60 of the optical coupling device 48. Namely, diverging light entering the optical coupling device 48 at its first optical interface 54, coming from the optical interface 32 of the PCB 10, will be propagated through the optical coupling device 48 to the second optical interface 60 as a substantially collimated beam, and will be focussed on the optical interface 42 of the optical mating device 24. Light propagates along the opposite direction in a similar way.

In particular, each transmission region 56, 62 of each optical interface 54, 60 of the optical coupling device 48 can be provided with a light beam forming structure 64, such as a lens. The lenses 64 optimise the optical coupling of the optical signals of the cores 26 and of the mating optical device 24 to/from the optical coupling device 48.

Using lenses allows to relax the positioning of the optical coupling device 48, the mating optical device 24 and the PCB 10, as well as the positioning of the waveguides with respect to the X, Y, Z reference system. Using lenses also allows to reduce the waveguide pitch down to, for example, 125 μm.

As shown in the present example, the lenses 64 may form an integral part of the optical coupling device 48. They are located at the first and second optical interfaces 54, 60. They could be of the Fresnel type or of the aspheric type for example. It will be appreciated that, for each optical interface 54, 60, all lenses 64 could be performed identical.

Figure 2:
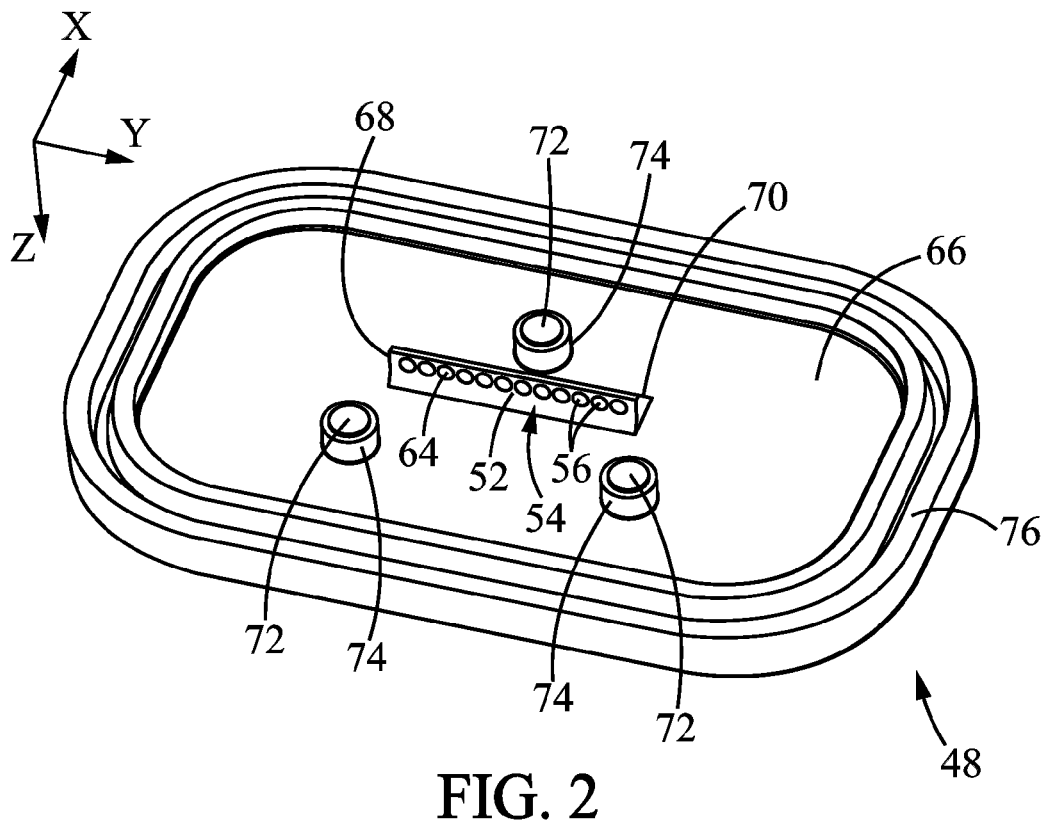
FIG. 2 is a perspective view of a bottom face of an optical coupling device of the optical communication system of FIG. 1.

FIG. 2 illustrates the bottom face of the optical coupling device 48. The optical coupling device 48 is provided as a thin plate having a bottom face 66 and an opposite parallel top face 58 (FIG. 1). A body 68 projects downwards from the bottom face 66, rather centrally. The body 68 carries the first optical interface 54, as well as a mirror 70 used to deflect light from direction X to direction Z.

Further, the optical coupling device 48 is provided with Z-reference parts 72. The Z-reference parts 72 are parts of the optical coupling device 48, the location of which along direction Z is precisely known with respect to the first optical interface 54. Three such Z-reference parts 72 are, for example, surfaces extending parallel to the XY plane and which can be provided on three feet 74 projecting from the bottom face 66. These feet 74 can be provided unaligned and of the same length, so that the three Z-reference parts 72 precisely define a plane.

The optical coupling device 48 further comprises a fixation part 76 used to fix the optical coupling device 48 to the support element 50. The fixation part 76 is provided at the periphery of the optical coupling device 48. The fixation part 76 is for example a peripheral ridge which extends continuously around the whole periphery of the optical coupling device 48 and which projects downwards from the bottom face 66.

Figure 3:
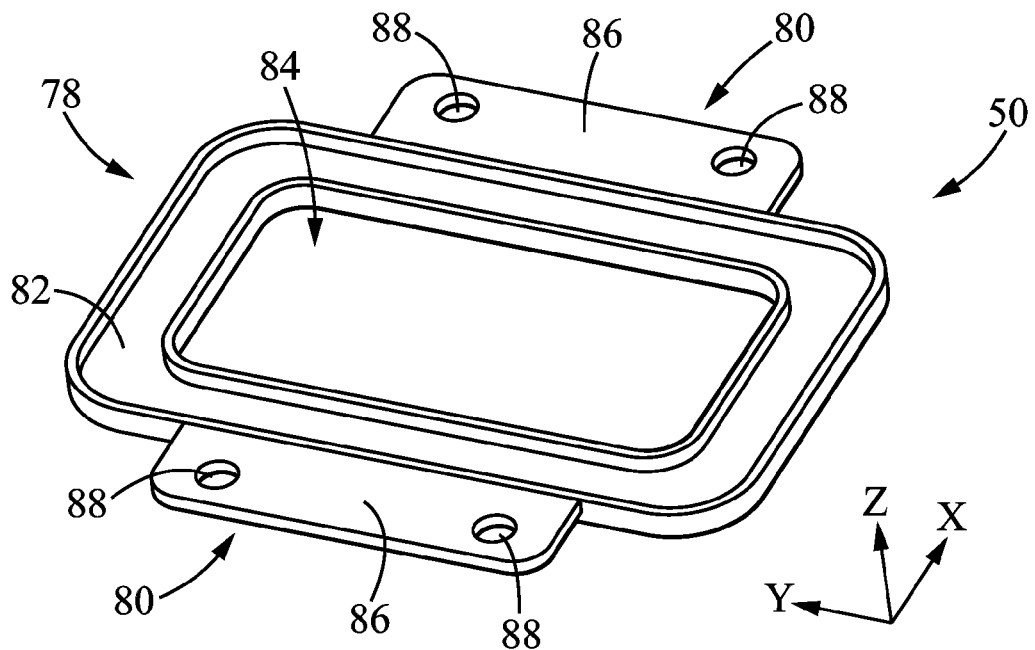
FIG. 3 is a perspective view of a top face of a support element of the optical communication system of FIG. 1.

The support element 50, shown on FIG. 3, comprises a central portion 78 and two lateral portions 80 extending from the central portion 78.

The central portion 78 is formed by an annular gutter 82 delimiting a central opening 84.

The annular gutter 82 is adapted to receive liquid curable glue in order to fix the fixation part 76 of the optical coupling device 48. The annular gutter 82 has a substantially U-shape cross-section and has, in a plane view, a substantially rectangular shape.

The central opening 84 has a substantially rectangular shape and is to be put over the cut-out 30 of the PCB 10 for receiving the body 68 and the Z-reference parts 72 of the optical coupling device 48.

The lateral portions 80 are formed by opposed mounting tabs 86 extending outwardly from opposed sides of the annular gutter 82. Mounting holes 88, for example two mounting holes 88, are provided in each mounting tab 86 to cooperate with corresponding mounting organs 90 (FIG. 1), such as screws, bolts, rivets, studs and the like, which are to be secured on the top surface 22 of the PCB 10.

The support element 50 is made from metallic or plastic material.

With reference to FIG. 4, the support element 50 is placed over the cut-out 30 of the PCB 10 so that the mounting holes 88 cooperate with the corresponding mounting organs 90. The support element 50 is thus removably mounted on the PCB 10.

The optical coupling device 48 is placed over the central opening 84 of the support element 50 and over the cut-out 30 of the PCB 10 so that the Z-reference parts 72 are laid on the Z-reference 43 of the PCB 10. In this manner, the position of the optical coupling device 48 with respect to the PCB 10 along direction Z is precisely defined.

If necessary, XY reference means (not shown) are used to carefully place the optical coupling device 48 with respect to the PCB 10 in the XY plane.

When the optical coupling device 48 is placed over the support element 50, the fixation part 76 is spaced apart from the gutter 82 to enable the Z-reference parts 72 to lay on the Z-reference 43 of the PCB 10.

Once the optical coupling device 48 is positioned, liquid curable glue 92 is dispensed in the gutter 82 from the periphery of the optical coupling device 48, for example using a syringe. Glue 92 will flow between the fixation part 76 and the gutter 82 of the support element 50. Fixation will occur between the optical coupling device 48 and the support element 50 upon curing of the glue 92, for example thermal curing or UV curing.

In a variant, glue 92 is dispensed in the gutter 82 before the positioning of the optical coupling device 48 on the support element 50 and the PCB 10.

The central portion 78 of the support element 50 having the shape of a gutter 82 enables to contain the glue 92 in the gutter 82, whereby the contact surface between the glue 92 and the fixation part 76 of the optical coupling device 48 is increased, thereby improving the fixation of the optical coupling device 48 on the support element 50 and thus on the PCB 10.

The gutter-shape of the central portion 78 also enables to prevent the glue 92 from spreading anywhere, especially in areas arranged on the first and second optical paths 34, 36 (FIG. 1) of optical signals transferred to or from the mating optical device 24 and to/from the cores 26 of the PCB 10.

Besides, the volume defined by the gutter 82 is precisely known, which allows an improved control of the amount of glue 92 required for fixing the optical coupling device 48.

In addition, as the support element 50 enables to contain the glue 92 in the gutter 82 and as the quantity of glue 92 is well mastered, it is ensured that the fixation part 76 and the glue 92 contact each other, thereby ensuring the fixation of the optical coupling device 48, thus compensating for the thickness deviations of the different layers of the PCB 10 due to the manufacturing tolerances of the PCB 10.

Figure 5:
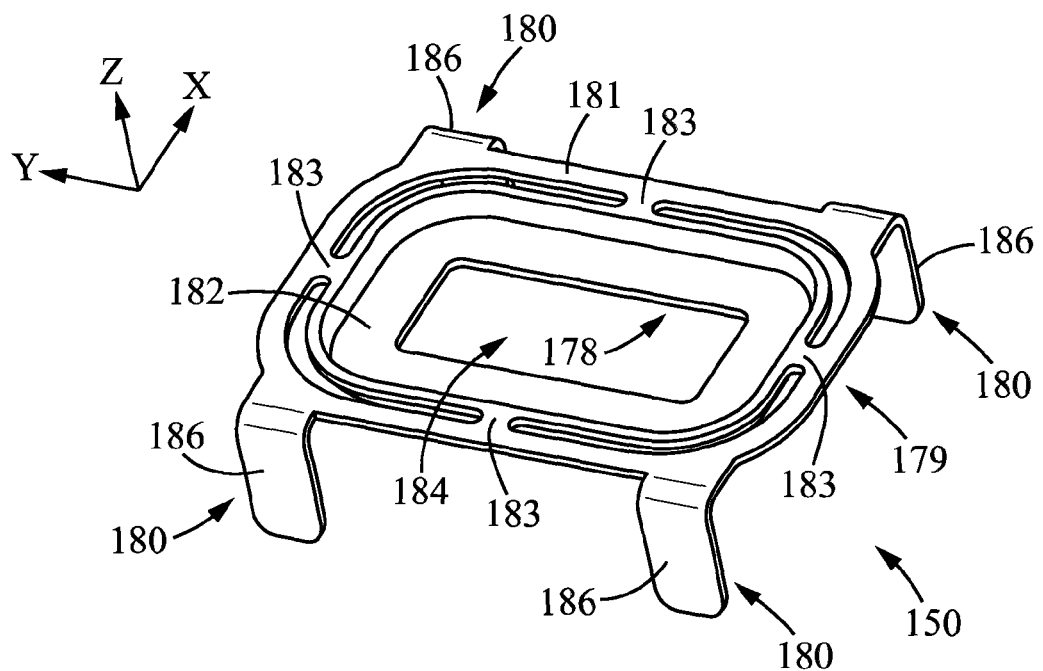
FIG. 5 is a view similar to that of FIG. 3 illustrating a first variant of the support element of the optical communication system of FIG. 1.

FIGS. 5 and 6 illustrate a first variant 150 of the support element.

The support element 150 comprises a central portion 178, four lateral portions 180 and an intermediate portion 179 linking the central and lateral portions 178, 180 to each other.

The central portion 178 is formed by an inner annular channel 182 delimiting a central opening 184.

The annular channel 182 is adapted to receive liquid curable glue 92 in order to fix the fixation part 76 of the optical coupling device 48. The annular channel 182 has a substantially L-shape cross-section and has, in a plane view, a substantially rectangular shape.

The central opening 184 has a substantially rectangular shape and is to be put over the cut-out 30 of the PCB 10 for receiving the body 68 and the Z-reference parts 72 of the optical coupling device 48.

The intermediate portion 179 comprises an outer ring 181 surrounding the annular channel 182 and having, in a plane view, a substantially rectangular shape. The outer ring 181 is spaced apart from and connected to the annular channel 182 by a plurality of tongues 183, four tongues 183 in the present example.

Each lateral portion 180 is formed by a mounting lug 186 extending outwardly and downwardly from a corner of the outer ring 181. Each mounting lug 186 is to be fitted, for example snap-fitted or press-fitted, into corresponding mounting grooves provided in the PCB 10 for removably mounting the support element 150 on the PCB 10.

The tongues 183 form deformable portions of the support element 150 adapted to compensate for thermal expansion of the PCB 10, the optical coupling device 48 and the support element 150 itself.

Indeed, the optical communication system is generally placed in environments wherein it undergoes thermal expansion. However, the different pieces of the optical communication system expand differently from each other due to different expansion coefficients. This leads, in the prior art, to a misalignment between these different pieces and thus to an inefficient or even non-existent optical coupling.

According to the invention, in case of thermal expansion, the deformable portions 183 allow to maintain the central portion 178 pressed against the PCB 10. The optical coupling device 48, fixed to the central portion 178 of the support element 150, is thus kept in alignment with the PCB 10 and the optical coupling is ensured.

Figure 7:
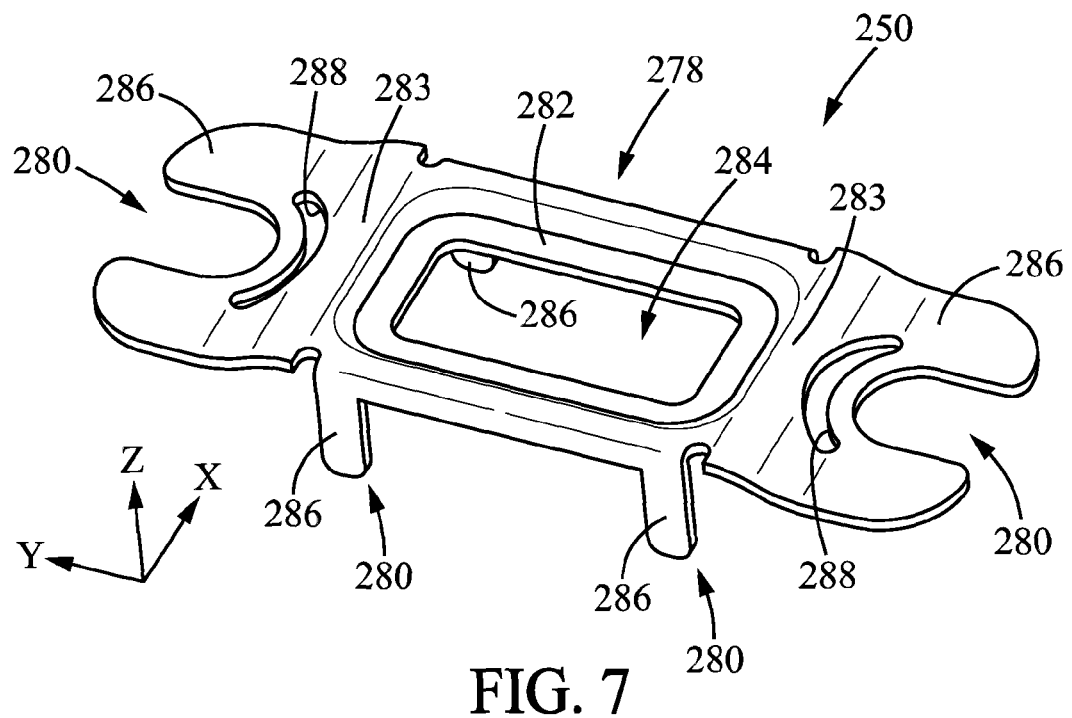
FIG. 7 is a view similar to that of FIG. 3 illustrating a second variant of the support element of the optical communication system of FIG. 1.

FIG. 7 illustrates a second variant 250 of the support element.

The support element 250 comprises a central portion 278 and six lateral portions 280 extending from the central portion 278.

The central portion 278 is formed by an annular channel 282 delimiting a central opening 284.

The annular channel 282 is adapted to receive liquid curable glue in order to fix the fixation part 76 of the optical coupling device 48. The annular channel 282 has a substantially L-shape cross-section and has, in a plane view, a substantially rectangular shape.

The central opening 284 has a substantially rectangular shape and is to be put over the cut-out 30 of the PCB 10 for receiving the body 68 and the Z-reference parts 72 of the optical coupling device 48.

The lateral portions 280 comprise four mounting lugs 286 extending outwardly and downwardly from a corner of the annular channel 282. Each mounting lug 286 is to be fitted, for example snap-fitted or press-fitted, into corresponding mounting grooves provided in the PCB 10 for removably mounting the support element 250 on the PCB 10.

The lateral portions 280 comprise two opposed mounting tabs 286 extending outwardly from opposed sides of the annular channel 282. A mounting hole 288 is provided in each mounting tab 286 to cooperate with corresponding mounting organs, such as screws, bolts, rivets, studs and the like, which are to be secured on the top surface 22 of the PCB 10.

Each mounting tab 286 is connected to the central portion 278 by deformable portions 283 adapted to compensate for thermal expansion of the PCB 10, the optical coupling device 48 and the support element 250 itself, as described above.

By providing a support element which is fixed to the optical coupling device and removably mounted on the optical circuit board, the invention thus provides an optical communication system with a dismountable optical coupling device which can be easily removed from the optical circuit board in case of misalignment, for repositioning, rework or change purposes without damaging the optical circuit board.

The invention claimed is:

1. An optical communication system comprising:
   an optical circuit board comprising an optical interface having at least a transmission region; and
   an optical coupling device comprising:
      a first optical interface having at least a first transmission region optically coupled to a corresponding transmission region of the optical interface of the optical circuit board;
      a second optical interface having at least a second transmission region adapted to be optically coupled to a corresponding transmission region of an optical interface of a mating optical device; and
      a fixation part; and
   a support element having a first end and a second end opposite the first end, the support element removably mounted on the optical circuit board such that the first end faces the optical circuit board,
   wherein the fixation part is attached to the second end of the support element.

2. An optical communication system according to claim 1, wherein the support element comprises a central portion receiving the fixation part of the optical coupling device, and lateral portions cooperating with the optical circuit board.

3. An optical communication system according to claim 2, wherein the central portion of the support element has a U-shape cross-section.

4. An optical communication system according to claim 2, wherein the central portion of the support element has a L-shape cross-section.

5. An optical communication system according to claim 2, wherein the lateral portions of the support element comprise mounting tabs provided with mounting holes, the mounting holes cooperating with mounting organs secured on the optical circuit board.

6. An optical communication system according to claim 2, wherein the lateral portions of the support element comprise mounting lugs fitted into corresponding mounting grooves provided in the optical circuit board.

7. An optical communication system according to claim 1, wherein the support element comprises deformable portions adapted to compensate for thermal expansion of the support element, of the optical coupling device and of the optical circuit board.

8. An optical communication system according to claim 1, wherein the support element is made from metallic material.

9. An optical communication system according to claim 1, wherein the support element is made from plastic material.

10. An optical communication system comprising:
    an optical circuit board having a first and second copper layers and a transmission region disposed between the first and second copper layers, the optical printed circuit board further comprising an optical interface having at least a transmission region; and
    an optical coupling device comprising:
       a first optical interface having at least a first transmission region configured to be optically coupled to a corresponding transmission region of the optical interface of the optical circuit board;
       a second optical interface having at least a second transmission region configured to be optically coupled to a corresponding transmission region of an optical interface of a mating optical device; and,
       a fixation part,
    wherein the support element is configured to be glued to the fixation part of the optical coupling device and removably mounted on the optical circuit board.

11. A method for assembling an optical communication system comprising the steps of:
    removably mounting a support element onto an optical circuit board,
    dispensing liquid curable glue on a surface of the support element that faces away from the optical circuit board,
    placing an optical coupling device over both the surface of the support element and the optical circuit board, and
    curing the glue to fix the optical coupling device to the support element such that the surface of the support element faces the optical coupling device.

12. An optical communication system according to claim 5, wherein the mounting organs are selected from the group consisting of screws, bolts, rivets, and studs.

13. An optical communication system according to claim 12, wherein the mounting organs non-adhesively cooperate with the mounting holes.

14. A support element according to claim 10, further comprising at least one lateral portion that extends from the support element, the at least one lateral portion comprising a mounting hole configured to receive a mechanical fastener.

15. A support element according to claim 10, further comprising an annular gutter configured to receive glue in order to fix the fixation part.

16. A support element according to claim 15, wherein the annular gutter has a substantially U-shape cross-section and a substantially rectangular shape.

17. A method according to claim 11, wherein removably mounting the support element on the optical circuit board comprises coupling the support element to the optical circuit board via mounting organs.

18. A method according to claim 11, wherein removably mounting the support element on the optical circuit board comprises non-adhesively mounting the support element on the optical circuit board.

19. A method according to claim 11, further comprising removing the support element from the optical circuit board.

20. An optical communication system comprising:
    a support element having a first end and a second end opposite the first end, the support element removably mountable on the optical circuit board such that the first end faces the optical circuit board, and
    an optical coupling device including:
       a first optical interface having at least a first transmission region;
       a second optical interface having at least a second transmission region adapted to be optically coupled to a corresponding transmission region of an optical interface of a mating optical device; and
       a fixation part configured to be attached to the second end of the support element, such that the first transmission region is optically coupled to a corresponding transmission region of the optical interface of the optical circuit board when the support element is removably mounted onto the optical circuit board.

21. An optical communication system according to claim 1, wherein the fixation part is glued to the second end of the support element.

22. An optical communication system according to claim 21, wherein the second end of the support element comprises a gutter configured to receive the glue, and the fixation part is configured to extend into the gutter and into the glue when the gutter receives the glue.

23. An optical communication system according to claim 20, an optical circuit board.

24. An optical communication system according to claim 23, wherein the optical circuit board comprises tubes that are embedded in a body having a lower refractive index than the tubes.

25. An optical communication system according to claim 23, wherein the optical circuit board defines a cut-out in the form of a right parallelepiped and is defined by straight walls.

26. An optical communication system according to claim 25, wherein the cut-out defines an optical interface that comprises discrete light transmission regions arranged as a row.

27. An optical communication system according to claim 26, wherein the spacing between the transmission regions along a lateral direction is constant.

28. An optical communication system according to claim 26, wherein the spacing between the transmission regions along a lateral direction is not constant.

* * * * *